United States Patent
Kobayashi et al.

(10) Patent No.: US 9,703,695 B2
(45) Date of Patent: Jul. 11, 2017

(54) CONTROL DEVICE, STORAGE DEVICE, AND COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventors: Hidefumi Kobayashi, Yokohama (JP); Yoshihito Konta, Kawasaki (JP); Atsushi Igashira, Yokohama (JP); Koutarou Nimura, Kawasaki (JP); Marie Abe, Kawasaki (JP); Mihoko Tojo, Kawasaki (JP); Masatoshi Nakamura, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 14/170,679

(22) Filed: Feb. 3, 2014

(65) Prior Publication Data
US 2014/0289493 A1 Sep. 25, 2014

(30) Foreign Application Priority Data
Mar. 22, 2013 (JP) ................................ 2013-059325

(51) Int. Cl.
G06F 12/00 (2006.01)
G06F 12/02 (2006.01)
G06F 12/0868 (2016.01)
G06F 3/06 (2006.01)

(52) U.S. Cl.
CPC ...... *G06F 12/0223* (2013.01); *G06F 12/0868* (2013.01); *G06F 3/0601* (2013.01)

(58) Field of Classification Search
None
See application file for complete search history.

(56) References Cited

U.S. PATENT DOCUMENTS

2008/0034153 A1* 2/2008 Lee ..................... G06F 12/0246
                                                                    711/103
2012/0137063 A1   5/2012 Horibe et al.
2012/0272038 A1* 10/2012 Wei ....................... G06F 3/0613
                                                                    711/206

FOREIGN PATENT DOCUMENTS

| JP | 10-106170 | 4/1998 |
| JP | 2009-134682 A | 6/2009 |
| JP | 2012-113789 | 6/2012 |

OTHER PUBLICATIONS

Japanese Office Action mailed Oct. 4, 2016 for corresponding Japanese Patent Application No. 2013-059325, with Partial English Translation, 5 pages.

* cited by examiner

*Primary Examiner* — Brian Peugh
(74) *Attorney, Agent, or Firm* — Fujitsu Patent Center

(57) ABSTRACT

A control device including a processor. The processor configured to allocate a data area of a memory device to a plurality of memory areas of data blocks of a first size; allocate identical data blocks of the first size to a plurality of the data areas of the memory device; manage management information indicating a data storing state of the plurality of memory areas of data blocks of the first size in each data area; determine, based on the management information regarding a plurality of data areas allocated with respect to a data block to be written, one data area from the plurality of data areas; and generate write data of a second size, which is different from the first size, including data of the data block to be written and write the write data in the one data area.

20 Claims, 15 Drawing Sheets

CONTROL DEVICE, STORAGE DEVICE, AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2013-059325, filed on Mar. 22, 2013, the entire contents of which are incorporated herein by reference.

FIELD

The present invention relates to a control device, a storage device, and a computer-readable recording medium having stored therein a control program.

BACKGROUND

In the related art, a 4K sector Hard Disk Drive (HDD), which performs 512 emulation, is known. The 4K sector HDD refers to an HDD using 4K bytes (4096 bytes (4 KiB)) as one sector, which is the smallest unit of data recorded on a disk (medium).

The 512 emulation refers to an emulation performed so that, although 1 sector=4096 bytes on the disk, it becomes 512 bytes/sector on an I/F (interface) with respect to a host device such as a PC or a server. Hereinafter, a 4K sector HDD performing the 512 emulation will be referred to as a "4K sector HDD (512E)".

Use of HDDs, which regard 512 bytes as one sector, predates the advent of 4K sector HDDs, and not a small number of host devices issue write commands with respect to HDDs in a 512 byte unit in conformity with HDDs of 512 bytes/sector.

A 4K sector HDD (512E) provides, in order to secure compatibility with a host device issuing a write command in a 512 byte unit as described above, the same I/F with respect to the host device as in the case of an HDD of 512 bytes/sector. Therefore, the host device can perform access to the 4K sector HDD (512E) using the same command and data size as in the case of access to an HDD of 512 bytes/sector.

In the case of a 4K sector HDD (512E), then, Read Modify Write (hereinafter, referred to as RMW) may be occurred in response to a write command from the host device. Hereinafter, RMW will be described with reference to FIG. 14 and FIG. 15.

FIG. 14 is a diagram illustrating an operation example of RMW by a 4K sector HDD (512E), and FIG. 15 is a diagram illustrating a correspondence between a Logical Block Address (LBA) and a sector in connection with the 4K sector HDD (512E).

As illustrated in FIG. 14, an information processing system 100 includes a storage device 200 and a host device 300. The host device 300 is an information processing device such as a PC or a server, and is configured to issue a write command and a read command in a 512 byte unit. The storage device 200 includes a controller module 400 and a 4K sector HDD (512E) 500. Hereinafter, the 4K sector HDD (512E) 500 will be simply referred to as an HDD 500.

The controller module 400 is a control device configured to perform access with respect to the HDD 500 in response to an access request from the host device 300, and includes a memory 410 configured to temporarily store write data, which is output to the HDD 500, and read data, which has been read from the HDD 500, and the like. The HDD 500 is a 4K sector HDD (512E), and includes a memory 510 configured to temporarily store read/write data exchanged with respect to the controller module 400 and a memory area (disk) 520 configured to memorize data.

The HDD 500, as illustrated in FIG. 15, manages 512 bytes as one block on an I/F with respect to the host device 300 and, on the other hand, manages 4096 bytes as one block (sector) on the disk. The host device 300, when performing access to the HDD 500 connected under the control of the controller module 400, designates an LBA of a 512 byte unit, which can be recognized by the host device 300 by means of the I/F of the HDD 500, and issues a command.

In the example of FIG. 15, LBAs #00 to #15 are blocks of 512 bytes, respectively, and sectors #0 and #1 are blocks of 4096 bytes, respectively. Furthermore, LBAs #00 to #07 correspond to sector #0 of the HDD 500, and LBAs #08 to #15 correspond to sector #1 of the HDD 500.

In connection with the information processing system 100 illustrated in FIG. 14, when a write command for writing write data of 512 bytes in LBA #02 is issued from the host device 300, the controller module 400 temporarily retains the write data in the memory 410. At this time, the controller module 400 manages the write data using a data block of a 512 byte unit.

The controller module 400 then writes the write data, which is retained in the memory 410, to the HDD 500 asynchronously (refer to arrow (1) in FIG. 14). The HDD 500, upon receiving the write data, reads data block #0 of 4096 bytes including LBA #02, which is the block to be written, from the memory area 520 to the memory 510 (refer to arrow (2) in FIG. 14).

Subsequently, the HDD 500 merges the data of 4096 bytes, which has been read from the memory area 520, and the write data received from the controller module 400 (refer to arrow (3) in FIG. 14). That is, the HDD 500 modifies data of 512 bytes in an area, which corresponds to LBA #02, among the data of 4096 bytes that has been read, with the write data.

Finally, the HDD 500 writes the post-merge data of 4096 bytes, which is held in the memory 510, to the memory device 520 (refer to arrow (4) in FIG. 14).

As described above, a 4K sector HDD (512E), upon receiving write data of less than 4096 bytes which correspond to one sector, performs the RMW indicated by (2) to (4) in FIG. 14.

A technology is also known, as a relevant technology, which enables recording of user data, without performing Read Modify, in an optical disk and the like that include unrecorded Error Correction Code (ECC) blocks (for example, refer to Patent Literature 1). According to this technology, when an optical disk device is commanded to record user data in a sector within an unused ECC block, it adds dummy data to user data, which has been transmitted from the host device, without performing RMW. The optical disk device then records the user data in the target ECC block with the data length being made equal to one ECC block by addition of dummy data.

A technology is also known, as another relevant technology, which increases the processing rate, in the case of a hard disk drive device configured to read/write in a disk in a 4K byte unit, when modifying management data of 512 bytes memorized in the disk (for example, refer to Patent Literature 2). According to this technology, a hard disk drive device has data of 4K bytes, which includes management data, memorized in advance in the cache memory; and, in response to a data write command, updates the management data inside the cache memory using management data from the PC. The hard disk drive device then writes data of 4K bytes, which includes the updated management data, from the cache memory to the disk.

[Patent Literature 1] Japanese Laid-open Patent Publication No. 10-106170

[Patent Literature 2] Japanese Laid-open Patent Publication No. 2012-113789

If the above-mentioned RMW occurs in the case of a 4K sector HDD (512E) 500, degradation of performance of the HDD may occur, compared with an HDD of 512 bytes/sector.

Specifically, when an HDD of 512 bytes/sector receives write data of 512 bytes, for example, it performs seek processing for the purpose of writing and write processing of write data. In contrast, a 4K sector HDD (512E) performs, when RMW occurs, not only processing as in the case of an HDD of 512 bytes/sector, but also seek processing for the purpose of reading, data read processing, and merge processing (refer to (2) to (4) of FIG. 14). As such, processing of RMW has an overhead larger than that of data writing by an HDD of 512 bytes/sector.

Particularly, when it comes to seek processing that takes a number of ms, it is performed once for the purpose of writing in the case of an HDD of 512 bytes/sector, whereas it is performed twice, in the case of RMW, for the purpose of reading and writing.

As such, RMW by a 4K sector HDD (512E) is more likely to degrade the HDD performance, as long as the HDD alone is concerned, than writing of data by an HDD of 512 bytes/sector.

Furthermore, according to the above-mentioned technology of adding dummy data to user data, the user data, to which dummy data has been added, is recorded into an unused ECC block, but no consideration is made regarding records inside blocks, in which data is already memorized.

In addition, according to the above-mentioned technology of having data of 4K bytes memorized in the cache memory in advance, the time and ratio of occupation of the cache memory increase, reducing the area of the cache memory that can be used as a cache with respect to the disk. Such reduction of the available area of the cache memory raises the possibility of cache miss, compared with an HDD having a cache memory of the same capacity, and possibly degrades the performance of the HDD.

Although examples of RMW occurring in the case of a 4K sector HDD (512E) have been described so far, the same problem occurs to other memory devices that store write data using a size different from the inputted smallest size (unit) and perform processing similar to RMW. Examples of such memory devices include flash memories such as a Solid State Drive (SSD) or a Universal Serial Bus (USB) memory, which memorizes write data in a page unit of 4K bytes or the like.

SUMMARY

According to an aspect of the embodiments, a control device, which performs input/output with respect to an upper level device in a data block unit of a first size and performs input/output of data with respect to each of data areas of a memory device in a unit of a second size different from the first size, the control device including a processor configured to allocate the data areas to a plurality of memory areas of data blocks of the first size, and allocate identical data blocks of the first size to a plurality of the data areas; manage first management information indicating a data storing state of the plurality of memory areas of data blocks of the first size in each of the data areas; determine, based on the first management information regarding a plurality of data areas allocated with respect to a data block to be written, a data area from the plurality of data areas; and generate write data of the second size including data of the data block to be written, and write the generated write data in the determined data area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described with reference to the drawings.

[1] First Embodiment

[1-1] Description of Information Processing System

Figure 1:
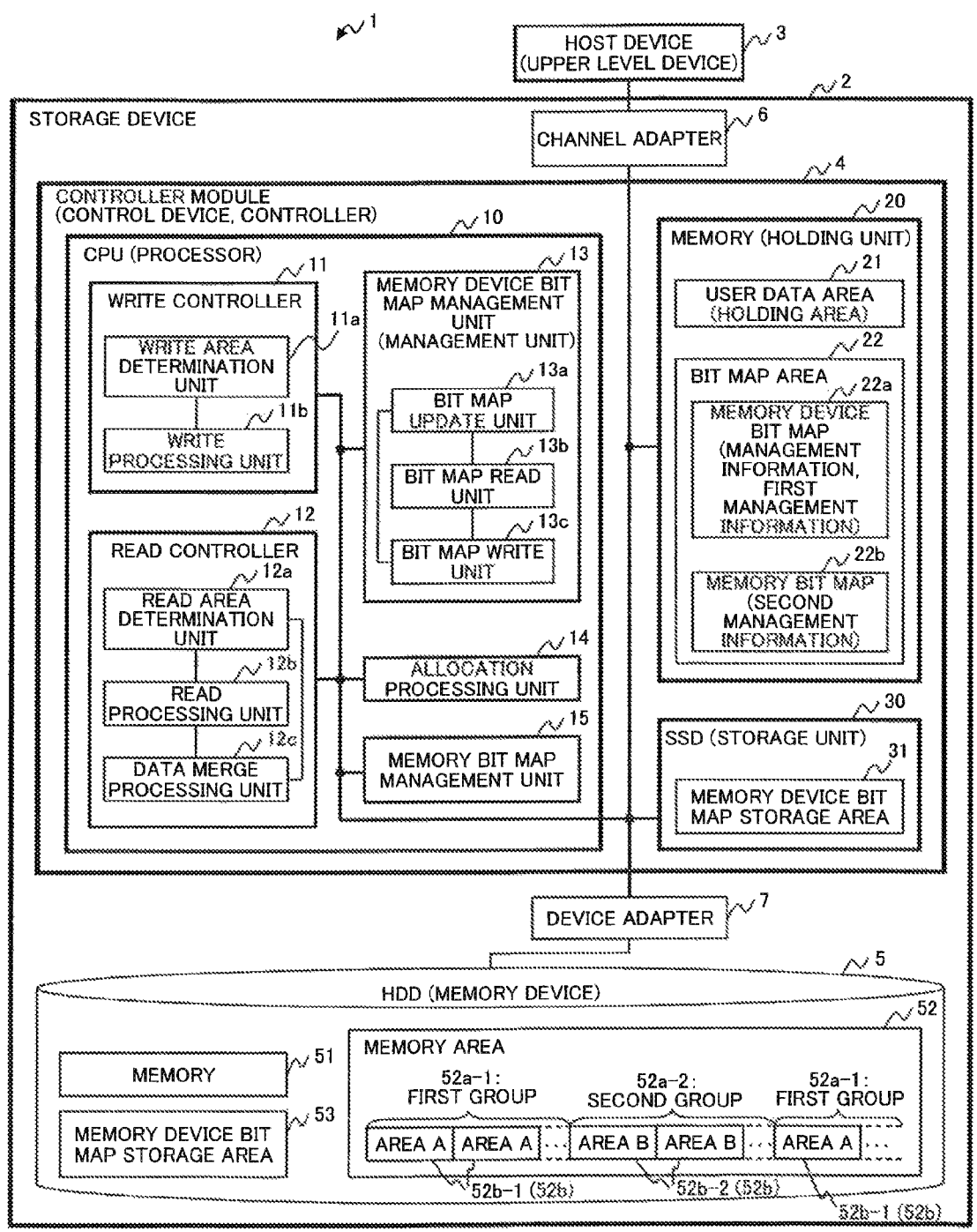
FIG. 1 is a diagram illustrating a configuration example of a communication system according to an embodiment.

FIG. 1 is a diagram illustrating a configuration example of an information processing system 1 according to an embodiment.

As illustrated in FIG. 1, the information processing system 1 includes a storage device 2 and a host device 3. The host device 3 is an information processing device such as a PC or a server, and is an example of an upper level device configured to issue a write or read command in a 512 byte unit with respect to the storage device 2. The storage device 2 includes a controller module 4, at least one 4K sector HDD (512E) 5, a channel adapter 6, and a device adapter 7. Hereinafter, the 4K sector HDD (512E) 5 will be simply referred to as an HDD 5.

The channel adapter 6 is a module connected to the host device 3 and configured to perform control of the interface with the host device 3, and is configured to perform communication or data transmission with the host device 3. The device adapter 7 is a module configured to perform control of the interface with the HDD 5 contained in the storage device 2, and is configured to perform communication or data transmission with the HDD 5.

The controller module (control device, controller) 4 is a control device configured to perform access with respect to the HDD 5 in response to an access request from the host device 3, and is a module configured to perform control including management of a memory 20 (described later) or various resources and write-back processing. The controller module 4 according to the present embodiment performs input/output in a data block unit of a first size with respect to the host device 3, and performs input/output of data in a second size unit, which is different from the first size, with respect to each data area of the HDD 5.

The HDD (memory device) 5 is a 4K sector HDD, which includes a processor (not illustrated) such as a Central Processing Unit (CPU), and which performs the above-mentioned 512 emulation. The HDD 5 also includes a memory 51, a memory area 52, and a memory device bit map 53. It is also possible to replace the HDD 5 with a flash memory, such as an SSD or a USB memory, which memorizes write data in a page unit of 4K bytes, for example, and which performs processing similar to RMW. In addition, although only one HDD 5 is illustrated in FIG. 1, a plurality of HDDs 5 can be connected to the controller module 4 via the device adapter 7.

The memory 51 is configured to temporarily store write/read data, which is exchanged with the controller module 4, and is, for example, a volatile memory such as a Random Access Memory (RAM) or a non-volatile memory such as a flash memory. The memory 51 can also be, besides the above-mentioned volatile or non-volatile memories, a memory device such as an HDD or an SSD, and various devices capable of memorizing information can also be used. It is also possible, for example, to use a separate area on the medium, similar to the memory area 52, as the memory 51.

The memory area 52 is a disk area configured to memorize various types of data or programs. In the case of the memory area 52 according to the present embodiment, a plurality of (for example, two) data areas are allocated with respect to one LBA. Hereinafter, the memory area 52 will be described with reference to FIG. 2.

Figure 2:
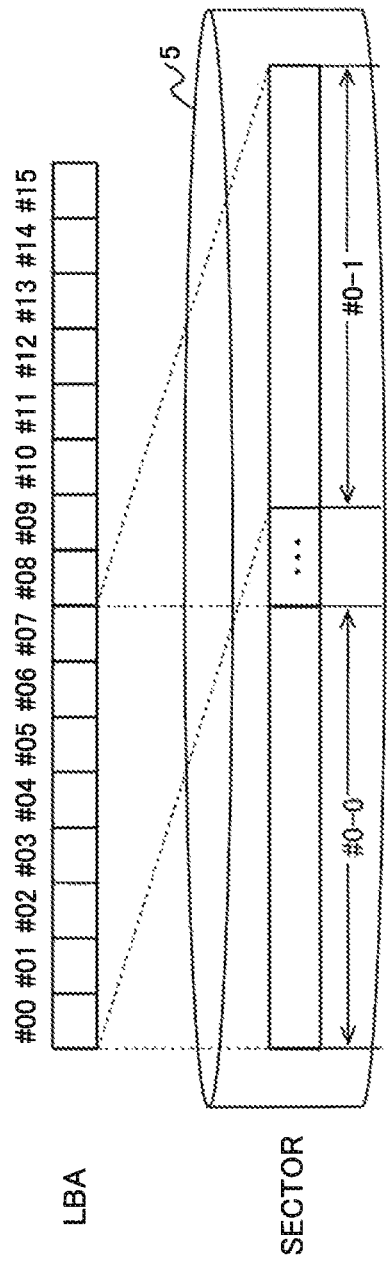
FIG. 2 is a diagram illustrating a correspondence between LBAs and sectors in connection with the HDD illustrated in FIG. 1.

FIG. 2 is a diagram illustrating a correspondence between LBAs and sectors in connection with the HDD 5 illustrated in FIG. 1. The HDD 5, as illustrated in FIG. 2, manages 512 bytes (first size) as one host block on the I/F with respect to the host device 3. The host block is an Input/Output (I/O) command unit data block from the host device 3 with respect to the HDD 5.

Meanwhile, the HDD 5 manages, on the memory area 52, 4096 bytes (second size), which is an integer multiple of the first size, as one sector block so as to correspond to each sector on the memory area 52. The sector block is an I/O command unit data block from the controller of the HDD 5 with respect to the memory area 52 of the hard disk. Furthermore, as illustrated in FIG. 2, LBAs #00 to #15 are blocks of 512 bytes, respectively, and sectors #0-0 and #0-1 are blocks of 4096 bytes, respectively. Hereinafter, sector blocks will be simply referred to as sectors.

In the case of the HDD 5 according to the present embodiment, LBAs #00 to #07 correspond to sector #0-0 and sector #0-1 of the HDD 5. In other words, a plurality of (two, in the example illustrated in FIG. 2) sectors (data areas) of 4096 bytes are allocated with respect to an LBA of a 512 byte unit, which can be recognized by the host device 3. In addition, although not illustrated in FIG. 2, two sectors (not illustrated) of the HDD 5 are also allocated with respect to LBAs #08 to #15. Such allocation is performed by an allocation processing unit 14 (described later).

Hereinafter, the memory area 52 will be described in more detail.

As described above, the controller module 4 or the HDD 5 manages one LBA (hereinafter, also referred to as a host block) using 512 bytes. Then, the controller module 4 (allocation processing unit 14) or the HDD 5 maps eight blocks, as one unit, to one sector of the memory area 52, and also maps another sector with respect to the same host blocks. Hereinafter, two sectors (refer to sectors #0-0 and #0-1 illustrated in FIG. 2) corresponding to the same eight host blocks will be referred to as area A 52b-1 and area B 52b-2, respectively. In addition, area A 52b-1 and area B 52b-2, when not differentiated, will hereinafter be referred to as data areas 52b. These area A 52b-1 and area B 52b-2 are different areas in the memory area 52, and any data area 52b includes an area corresponding to each LBA of a plurality of data blocks of the first size.

In the memory area 52, areas A 52b-1 and areas B 52b-2 are arranged alternately, for example in a unit of tens of sectors to hundreds of sectors, in the form of: a plurality of areas A 52b-1, a plurality of areas B 52b-2, a plurality of areas A 52b-1, . . . (refer to FIG. 1). That is, areas A 52b-1 and areas B 52b-2 are not arranged in the memory area 52 one sector after another, but, based on consideration of writing or reading of consecutive host blocks, a plurality of sectors are preferably grouped in a meaningful unit. In addition, the disk of the HDD 5 exhibits better performance at the outer periphery than at the inner periphery, in relation to the number of sectors per track and the angular velocity, so that, considering such a performance difference, a pair of areas A 52b-1 and areas B 52b-2 are preferably not spaced excessively.

Such grouping of areas A 52b-1 and areas B 52b-2 in a predetermined unit, respectively, can suppress degradation of performance of the HDD 5 even when sequential access is performed by the host device 3. Hereinafter, a group of areas A 52b-1 in the memory area 52 will be referred to as a first group 52a-1, and a group of areas B 52b-2 will be referred to as a second group 52a-2.

In this connection, data stored in area A 52b-1 and area B 52b-2, which correspond to the same eight host blocks, has an exclusive relationship for each host block. Attention is directed to LBAs #00 to #07 illustrated in FIG. 2 for further description: assuming, for example, that latest data of LBAs #00 to #03 is stored in sector #0-0, which is area A 52b-1, data stored in sector #0-1, which is area B 52b-2, is invalid data. On the other hand, assuming that latest data of LBAs #04 to #07 is stored in sector #0-1, data stored in sector #0-0 becomes invalid data.

The HDD 5 receives control by the controller module 4 (described later), which is based on the above-mentioned exclusive relationship of each data area, and stores data blocks of a first size in one of a plurality of data areas of a second size, which is larger than the first size. Storing of data by the HDD 5 will be described later in detail.

The memory device bit map storage area 53 is configured to store a memory device bit map 22a, which is used to manage an exclusive data storing state regarding areas A 52b-1 and areas B 52b-2.

The memory device bit map (management information, first management information) 22a is information indicating the data storing state of memory areas of a plurality of data blocks of the first size in each data area 52b. The memory device bit map 22a can, as illustrated below, be bit map information indicating, for each data block included in one data area 52b of areas A 52b-1 and 52b-2, whether the data storing state of the corresponding data block is valid or not. Assuming, for example, that data of LBAs #00 to #03 is stored in area A 52b-1, and data of LBAs #04 to #07 in area B 52b-2, the data storing state indicated by the memory device bit map 22a regarding LBAs #00 to #07 is as follows:

Area A 52b-1: 11110000
Area B 52b-2: 00001111

In the case of the above-mentioned memory device bit map 22a, one bit corresponds to one host block of 512 bytes, and it is arranged in the ascending order of LBAs from the left. In connection with the memory device bit map 22a, furthermore, "1" indicates validity, i.e. that data of the host block is the latest in the corresponding sector, while "0" indicates invalidity, i.e. data of the host block stored in the corresponding sector is invalid.

Furthermore, although an example of the memory device bit map 22a regarding LBAs #00 to #07 has been described with respect to both area A 52b-1 and area B 52b-2, respective bit maps have an exclusive relationship, so that it is also possible to set a bit map of one of area A 52b-1 and area B 52b-2 in the memory device bit map 22a. Therefore, it will be assumed in the following that the bit map of area A 52b-1 is set in the memory device bit map 22a, but, for convenience of description, it will also be assumed in some occasions that the bit map of area B 52b-2 is also set in the memory device bit map 22a.

The memory device bit map storage area 53 is configured to store the memory device bit map 22a regarding a first group 52a-1 (all of areas A 52b-1) in the memory area 52. For example, when the memory area 52 of the HDD 5 has a capacity of 300 Gbytes, the memory device bit map storage area 53 stores a memory device bit map 22a of about 36 Mbytes regarding the first group 52a-1.

The memory device bit map storage area 53 can also be a part of the disk area of the HDD 5.

[1-2] Description of the Controller Module

Next, the controller module 4 will be described in detail with reference to FIG. 1.

As illustrated in FIG. 1, the controller module 4 includes a CPU 10, a memory 20, and an SSD 30.

The CPU (processor) 10 is an example of a processing device (processor) connected to the memory 20, the SSD 30, the channel adapter 6, and the device adapter 7, respectively, and configured to perform various types of control and operation. The CPU 10 realizes various functions of the controller module 4 by executing programs stored in the memory 20, the SSD 30, the HDD 5, or a Read Only Memory (ROM) (not illustrated). The CPU 10 according to the present embodiment realizes functions as a processor, including a write controller 11 (described later), a read controller 12, a memory device bit map management unit 13, an allocation processing unit 14, and a memory bit map management unit 15, by executing control programs stored in the memory 20 and the like.

The memory (holding unit) 20 is a memory device, such as a cache memory, configured to temporarily store various types of data or programs, and, when the CPU 10 executes a program, temporarily stores/expands data or the program to use it. For example, the memory 20 includes a user data area 21 and a bit map area 22. The memory 20 may also be a volatile memory, such as a RAM, for example.

The user data area (holding area) 21 is an area configured to temporarily store a control program used by the CPU 20 to function as a processor, write data to be written from the host device 3 to the HDD 5, or read data to be read from the HDD 5 to the host device 3. The user data area 21 is an area of at least 4096 bytes, which correspond to the second size. In addition, the write data is a data block that is written in one of area A 52b-1 and area B 52b-2 (data block to be written), and is input in a 512 byte unit, which is the first size, from the host device 3.

The bit map area 22 is an area configured to hold the memory device bit map 22a and the memory bit map 22b, which are referred to by the CPU 20. In addition, the memory device bit map 22a held by the bit map area 22 is at least a part of the memory device bit map 22a stored in the memory device bit map storage area 53 of the HDD 5 or the memory device bit map storage area 31 of the SSD 30. The memory device bit map 22a and the memory bit map 22b, which are held by the bit map area 22, will be described later in detail.

The SSD (storage unit) 30 is a memory device configured to store various types of data or programs, and includes a memory device bit map storage area 31. The memory device bit map storage area 31 stores the same memory device bit map 22a as that stored in the memory device bit map storage area 53 of the HDD 5 described above. In addition, although both the SSD 30 and the HDD 5 store the memory device bit map 22a in the example illustrated in FIG. 1, it is also possible for only one of the SSD 30 and the HDD 5 to store the memory device bit map 22a. Furthermore, the memory device bit map storage area 53 of the SSD 30 and/or the HDD 5 can be replaced with another memory device accessible from the CPU 10. The controller module 4 can also include, instead of the SSD 30, an HDD, for example.

[1-3] Description of the Processor

Next, respective functions realized by the CPU 10 as a processor will be described.

The allocation processing unit 14 is configured to perform processing of allocating data areas 52b of the HDD 5 to memory areas of a plurality of data blocks of the first size and allocating the same data blocks of the first size to a plurality of data areas 52b. That is, the allocation processing unit 14 allocates, as described above, data areas 52b alternately in a unit of tens of sectors to hundreds of sectors, for example, in the form of: a plurality of areas A 52b-1, a plurality of areas B 52b-2, a plurality of areas A 52b-1, . . . (refer to FIG. 1).

The conversion of the address between an LBA and one sector of the HDD 5 by the allocation processing unit 14 can be realized by various methods known in the art. According to the present embodiment, in contrast to such methods, the logic is modified to obtain a plurality of (two) sectors corresponding to one LBA so that conversion of the address between an LBA and a plurality of (two) sectors of the HDD 5 can be realized.

The memory device bit map management unit (management unit) 13 is configured to manage the data storing state regarding a plurality of data areas 52*b* so that a data block from the host device 3 can be exclusively stored in one of area A 52*b*-1 and area B 52*b*-2 in the HDD 5. The management of the data storing state by the memory device bit map management unit 13 is performed based on the memory device bit map 22*a* and the memory bit map 22*b*, which are held in the bit map area 22 of the memory 20. For example, the memory device bit map management unit 13 includes a bit map update unit 13*a*, a bit map read unit 13*b*, and a bit map write unit 13*c*.

The bit map update unit 13*a* is configured to compose or update the memory device bit map 22*a* based on the memory bit map 22*b* when a data block held in the memory 20 is written to one data area 52*b* through write-back by the write controller 11 (described later).

Specifically, when a data block written in the user data area 21 from the host device 3 is written to one data area 52*b*, the bit map update unit 13*a* updates the data storing state of a plurality of memory areas allocated with respect to the corresponding data block.

More specifically, the bit map update unit 13*a* rewrites the memory device bit map 22*a*, in connection with the data storing state of a plurality of memory areas allocated with respect to a data block to be written, so as to meet the following two conditions:

among the plurality of memory areas, a memory area allocated with respect to the data block to be written within one data area 52*b* indicates validity when data of the data block is written.

among the plurality of memory areas, a memory area allocated with respect to the data block to be written within all the other data areas 52*b* indicates invalidity.

For example, with respect to the memory device bit map 22*a* of a data area 52*b* in which a host block is written, the bit map update unit 13*a* updates the bit at a location corresponding to a data block, for which "1" is set in the memory bit map 22*b*, to "1".

When there is no memory device bit map 22*a* in question, for example, when the HDD 5 is formatted, the bit map update unit 13*a* newly composes a memory device bit map 22*a* in question and stores it in the bit map area 22.

When the HDD 5 is formatted, valid data (for example, "0") is set in all data areas 52*b* of the first group 52*a*-1 and the second group 52*a*-2. In this case, valid data exists in all data areas 52*b*, but the bit map update unit 13*a* composes a memory device bit map 22*a*, all bits of which are "1" (valid), with respect to one group of the first group 52*a*-1 and the second group 52*a*-2.

The bit map read unit 13*b* is configured to read a part of the memory device bit map 22*a*, which is related to a data area 52*b* corresponding to an instruction from the CPU 10, from the SSD 30 or the HDD 5 and expand the part in the bit map area 22 of the memory 20.

The bit map read unit 13*b* can also estimate a part of the memory device bit map 22*a*, which is read from the SSD 30 and the like, not by following an instruction from the CPU 10, but by monitoring the inside of the CPU 10 or the channel adapter 6. That it, the bit map read unit 13*b* can estimate a data area 52*b*, which is to be processed by the CPU 10, from a write/read command through the host device 3 obtained by monitoring. By estimating a data area 52*b* to be processed, the bit map read unit 13*b* can have a memory device bit map 22*a*, which is requested by the CPU 10, stored in the bit map area 22 in advance, thereby improving the processing performance of the controller module 4.

The bit map write unit 13*c* is configured to write the memory device bit map 22*a*, which is held in the bit map area 22, to the SSD 30 or the HDD 5 at predetermined timing and update the memory device bit map 22*a* inside the memory device bit map storage area 31 or 53. As an example of the predetermined timing, one of the following (i) to (iii) or a combination thereof can be given:

(i) periodic timing (ii) timing at which write-back to the HDD 5 is performed by the write controller 11

(iii) timing at which the size of the memory device bit map 22*a* inside the bit map area 22 has become equal to or larger than a predetermined size As such, the memory device bit map management unit 13 manages the data storing state so that a memory area, which has been allocated to a data block in one data area 52*b* of a plurality of data areas 52*b*, indicates validity exclusively with respect to a memory area allocated with respect to the corresponding data block in all the other data areas. The memory device bit map management unit 13 also performs the above-mentioned management, in connection with memory areas of a plurality of data blocks allocated to each data area 52*b*, for each data block.

The memory bit map management unit 15 is configured to manage a memory bit map 22*b* indicating whether user data from the host device 3 (user data to be written) is written in a data block inside a corresponding data area 52*b* within the HDD 5.

The memory bit map (second management information) 22*b* is information indicating an area, in which a data block to be written is stored, among a plurality of data areas 52*b* allocated with respect to the data block to be written. Attention will be directed to LBAs #00 to #07 illustrated in FIG. 2 for further description: when data of LBAs #03 and #04 is input from the host device 3 as user data to be written in sector #0-0 or #0-1 of the HDD 5, the memory bit map 22*b* becomes as follows:

LBAs #00 to #07: 00011000

In the case of the above-mentioned memory bit map 22*b*, one bit corresponds to one host block of 512 bytes, and it is arranged in the ascending order of LBAs from the left. In connection with the memory bit map 22*b*, "1" indicates validity, i.e. that data of the host block at the corresponding location is to be written, while "0" indicates invalidity, i.e. data of the host block at the corresponding location is not to be written.

The memory bit map management unit 15 composes the above-mentioned memory bit map 22*b* in response to a write command from the host device 3 and stores it in the bit map area 22 of the memory 20.

In this case, user data to be written is stored at an arbitrary location in the user data area 21. Therefore, the memory bit map management unit 15 preferably sets a correspondence between the location at which the user data to be written is stored in the user data area 21 and the memory bit map 22*b* to manage them.

If the user data stored in the user data area 21 is written-back to the HDD 5, the memory bit map management unit 15 destroys the memory bit map 22*b* corresponding to the same user data or updates it to all "0".

[1-3-1] Description of Write Controller

The write controller 11 is configured to perform control of temporarily retaining write data in the memory 20 in response to a write command from the host device 3 and writing it to the HDD 5 asynchronously through write-back and the like. For example, the write controller 11 includes a write area determination unit 11*a* and a write processing unit 11*b*.

The write area determination unit 11*a* is configured to determine one data area 52*b* from a plurality of data areas 52*b* based on the memory device bit map 22*a* of a plurality of data areas 52*b* allocated with respect to a data block to be written, which is held in the bit map area 22. In this regard, one data area 52*b* refers to a data area 52*b* in the HDD 5, in which reading of a data block following writing of the data block, i.e. RMW occurs as little as possible.

In addition, the write area determination unit 11*a* does not determine (detect) a data area 52*b*, in which RMW does not occur, in some cases. In such a case, RMW occurs in the HDD 5, but the following processing can suppress the influence on degradation of performance of the HDD 5 by RMW occurring at this time or later or facilitate determination of a data area 52*b* in which RMW does not occur.

For example, when it is impossible to determine a data area 52*b* in which RMW does not occur, the write area determination unit 11*a* selects one data area 52*b* from a plurality of data areas 52*b* according to a predetermined condition. The predetermined condition can be increase of possibility that degradation of performance of the HDD 5 will occur, for example, the processing load of the HDD 5 becoming equal to or higher than a predetermined threshold, or more than a predetermined number of write/read commands issued from the host device 3.

Figure 14:
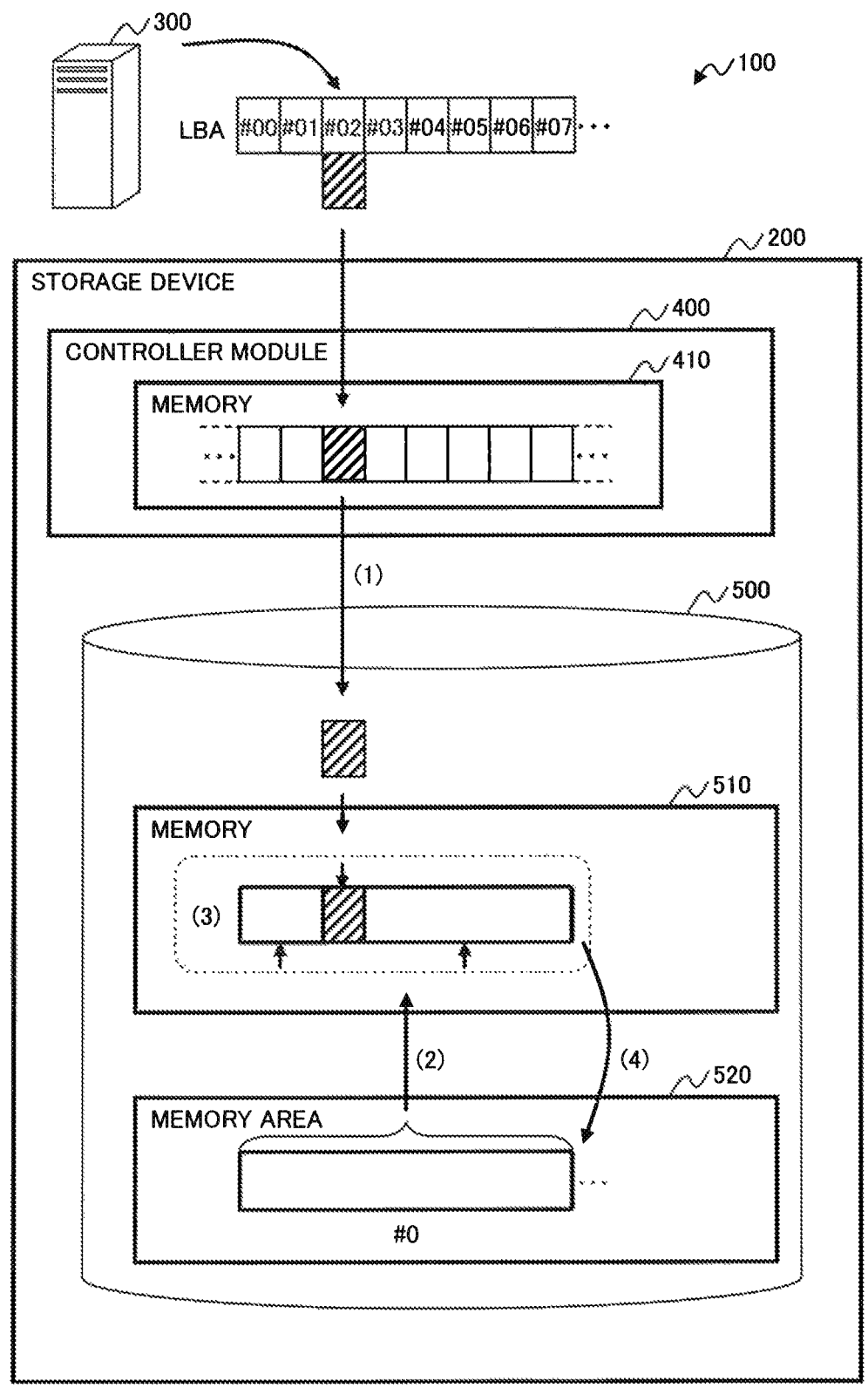
FIG. 14 is a diagram illustrating an operation example of RMW by an HDD.
Figure 15:
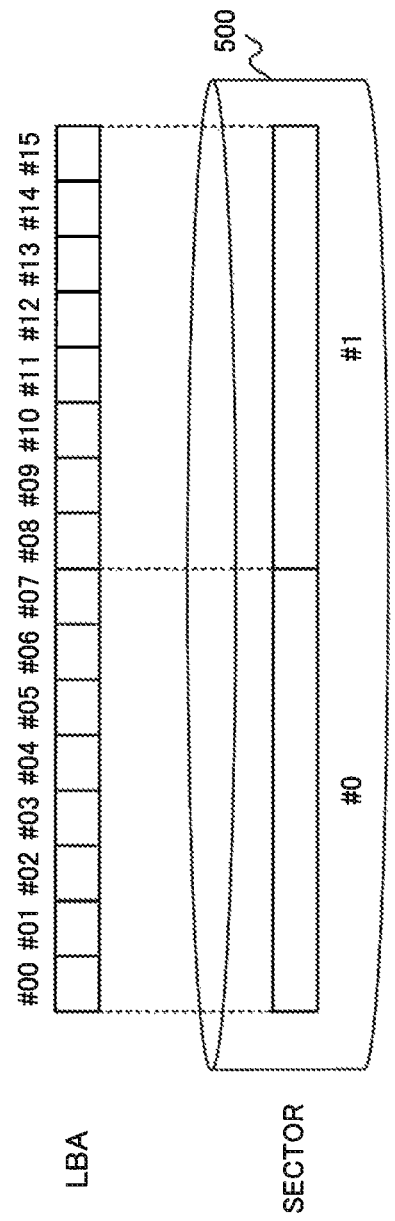
FIG. 15 is a diagram illustrating a correspondence between LBAs and sectors in the case of a 4K sector HDD (512 emulation).

When the possibility that degradation of performance of the HDD 5 will occur has increased, the write area determination unit 11*a* selects a data area 52*b* that has a decreased processing amount of seek processing and merge processing (refer to (3) in FIG. 14) by the HDD 5 in connection with RMW. On the other hand, when the possibility that degradation of performance of the HDD 5 will occur has decreased, the write area determination unit 11*a* selects a data area 52*b*, the memory device bit map 22*a* of which is likely to be biased between a plurality of data areas 52*b*, for the purpose of facilitating determination of a data area 52*b* in which RMW does not occur at this time or later.

Methods of determination of one data area 52*b* by the write area determination unit 11*a* will be described later.

The write processing unit 11*b* is configured to perform processing of generating a write data block (write data) of the second size, which includes data of a data block to be written, and writing the generated write data block to one data area 52*b* determined by the write area determination unit 11*a*.

Specifically, the write processing unit 11*b* generates a write data block by adding dummy data to user data (data block) to be written, in the user data area 21, so that the data is rounded off in a 4096 byte unit. More specifically, based on the memory bit map 22*b* and the storage location of user data within the user data area 21, the write processing unit 11*b* acquires data (write data block) within the user data area 21 as much as 4096 bytes, including the user data to be written. The acquired data includes user data (data block) to be written and dummy data (unnecessary data) existing before and/or after the user data to be written, in terms of the address of the user data area 21.

The dummy data is a data block already written-back to the HDD 5 by the write controller 11. Therefore, the write processing unit 11*b* can make use of unnecessary data blocks remaining in the user data area 21, when generating a write data block, and thus can generate a write data block more quickly than when dummy data is generated and added to user data. The controller module 4 can distinguish between user data and dummy data by means of the memory bit map 22*b*.

Attention will be directed to LBAs #00 to #07 in FIG. 2 for further description: it will be assumed, for example, that data of LBAs #03 and #04 is written in the memory 20 from the host device 3 as user data to be written. The write processing unit 11*b* groups together data blocks to be written of LBAs #03 and #04 in the user data area 21 and data blocks in the user data area 21, which correspond to LBAs #00 to #02 and #05 to #07, to acquire a write data block. That is, the write processing unit 11*b* generates a write data block using at least two data blocks, including data blocks to be written, held in the user data area 21.

As such, data blocks are written in a 4096 byte unit in the HDD 5 by the write processing unit 11*b* so that, with no RMW occurring, write performance comparable to that of a conventional HDD of 512 bytes/sector can be maintained. Furthermore, use of actual data within the user data area 21, when generating a write data block, makes it easy to generate a write data block of 4096 bytes.

The write processing unit 11*b* can also generate a write data block by adding arbitrary dummy data of "0" or "1" to a data block from the host device 3.

Furthermore, as described above, the write area determination unit 11*a* does not determine (detect) a data area 52*b*, in which RMW does not occur, in some cases. In such a case, the write processing unit 11*b* generates a write data block of a predetermined size, which includes a data block to be written, based on the memory device bit map 22*a* of a plurality of data areas 52*b* allocated with respect to the data block to be written. The write processing unit 11*b* then writes the generated write data block of a predetermined size to one data area 52*b* selected by the write area determination unit 11*a*.

When user data from the host device 3 is in a 4096 byte unit, which is the second size, RMW does not occur, so that the write area determination unit 11*a* does not perform processing of determination of a data area 52*b* but selects an arbitrary one from corresponding data areas 52*b*. The write processing unit 11*b* then writes the user data of the second size to the one data area 52*b* selected by the write area determination unit 11*a*.

In other words, the write area determination unit 11*a* performs, when user data from the host device 3 meets a condition in which RMW occurs, determination of one data area 52*b* based on the memory device bit map 22*a*. As a condition of occurrence of RMW, there is a case in which user data from the host device 3 is less than 4096 bytes (or its size is not an integer multiple of 4096 bytes). As another condition of occurrence of RMW, there is a case where the start address of user data, the size of which is an integer multiple of 4096 bytes, deviates from the start address of the data area 52*b*.

When the write data block is written in a data area 52*b* by the write processing unit 11*b*, the bit map update unit 13*a* updates the memory device bit map 22*a* in connection with the data block to be written, which is included in the write data block, as described above.

Next, operation examples of the write controller 11 will be described with reference to FIG. 3 to FIG. 8, FIG. 9A and FIG. 9B. FIG. 3 to FIG. 8 are diagrams illustrating operation examples by the processor illustrated in FIG. 1, respectively, and FIG. 9A and FIG. 9B are diagrams illustrating the amount of merge at the HDD 5 in connection with the operation examples illustrated in FIG. 7 and FIG. 8, respectively. In FIG. 3 to FIG. 8, FIG. 9A and FIG. 9B, numerals inside "memory areas" and "user data areas" surrounded by frames indicate the generation numbers of data blocks, and English letters indicate that the corresponding data blocks have meaningless (invalid) data set therein. Furthermore, in FIG. 3 to FIG. 8, FIG. 9A and FIG. 9B, the memory device bit map 22a is bit map information regarding area A 52b-1 (first group 52a-1).

[1-3-1-1] Case in which the Memory Device Bit Map of Area a or Area B is all "1"

The write area determination unit 11a, when determining a data area 52b in which a data block is to be written, determines whether the data storing state of the memory device bit map 22a of one of corresponding area A 52b-1 and area B 52b-2 is all "1". When it is determined that one of area A 52b-1 and area B 52b-2 is all "1", the write area determination unit 11a determines the data area 52b, which is not all "1", as one data area 52b in which a data block is to be written.

In other words, the write area determination unit 11a selects, as one data area 52b, a data area 52b in which the data storing state of the memory device bit map 22a of a plurality of data areas 52b allocated with respect to the data block to be written is all "0".

An example will be described with reference to FIG. 3. It will be assumed that the memory area 52 of the HDD 5 has just been formatted, and the entire data areas 52b memorize data of all "0". As illustrated in (1) of FIG. 3, in the memory device bit map 22a right after formatting, all "1" are set in area A 52b-1 by the bit map update unit 13a. In this case, as illustrated in (2) of FIG. 3, the memory device bit map 22a regarding area B 52b-2 is all "0".

Figure 3:
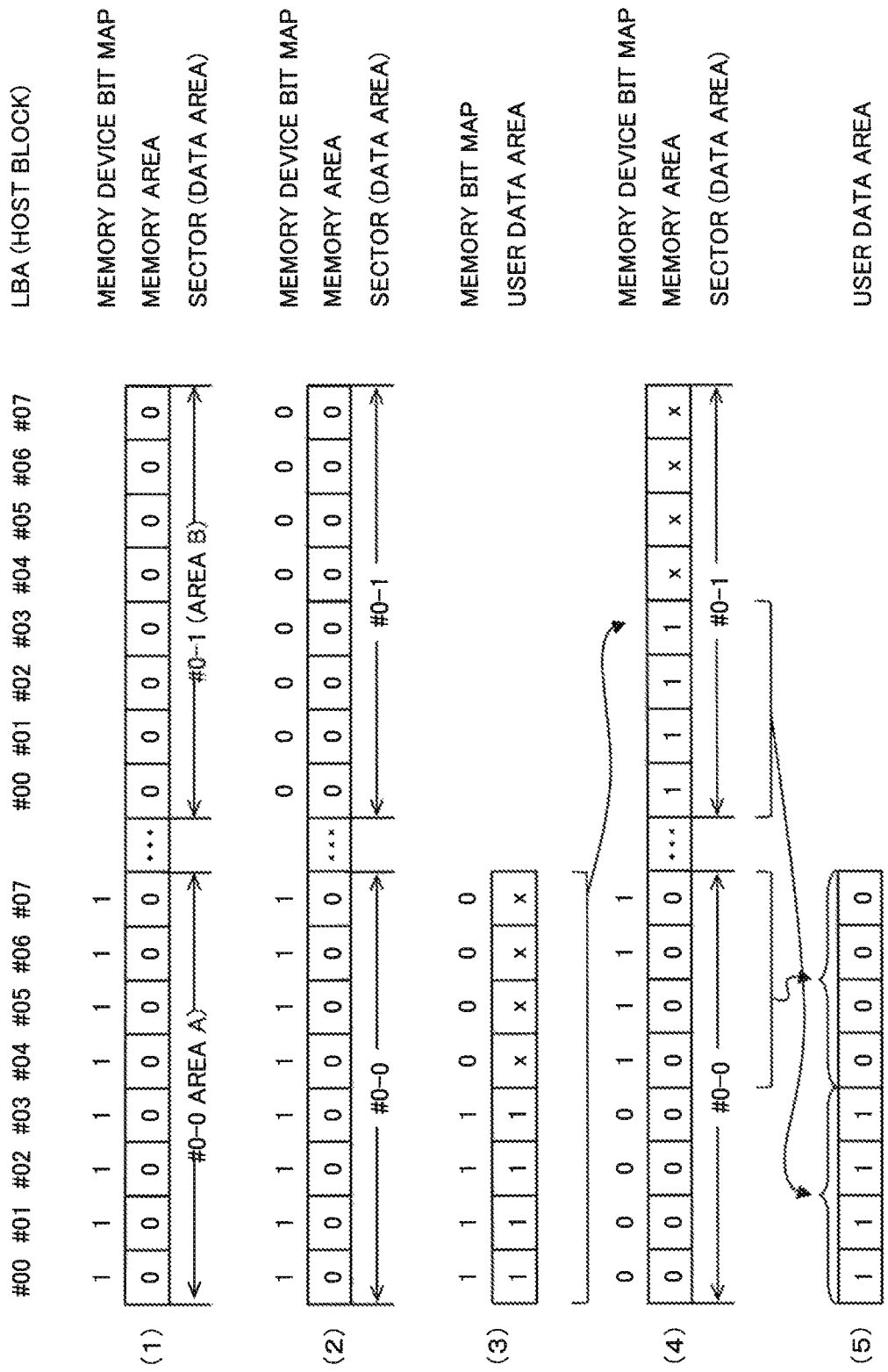
FIG. 3 is a diagram illustrating an operation example by the processor illustrated in FIG. 1.

Referring to (3) of FIG. 3, when the host device 3 issues a command to write data blocks of generation "1" with respect to LBAs #00 to #03, the memory bit map management unit 15 generates a memory bit map 22b having "1" for the first four bits.

The write area determination unit 11a, in response to the write command, refers to the memory device bit map 22a of sector #0-0 (area A 52b-1), which corresponds to the LBA to be written, and determines whether the entire bits are "1".

In the example illustrated in (2) of FIG. 3, the memory device bit map 22a of area A 52b-1 is all "1", so that the write area determination unit 11a determines area B 52b-2, which is different from area A 52b-1, as one data area 52b in which the data block is to be written.

In addition, the write processing unit 11b writes data blocks of LBAs #00 to #03 to be written (short block of 2048 bytes) in area B 52b-2 determined by the write area determination unit 11a. At this time, write-back of only four blocks of LBAs #00 to #03 in area B 52b-2 causes RMW in the HDD 5. Therefore, the write processing unit 11b generates (acquires), based on the memory bit map 22b, data blocks of LBAs #00 to #03 to be written and data blocks of LBAs #04 to #07 which are dummy data, from the user data area 21. The write processing unit 11b then writes the generated write data block of 4096 bytes in the data area 52b determined by the write area determination unit 11a (refer to (4) of FIG. 3).

Furthermore, when the write processing unit 11b performs writing of the write data block, the bit map update unit 13a updates the memory device bit map 22a based on the memory bit map 22b.

Although it has been assumed in the description that the write area determination unit 11a refers to the memory device bit map 22a of area A 52b-1 and determines whether the entire bits are "1", the present embodiment is not limited to this. For example, the write area determination unit 11a can determine whether the entire bits of the memory device bit map 22a of area A 52b-1 are "0". If a determination of "0" is made, the write area determination unit 11a determines area A 52b-1 as one data area 52b in which the data block is to be written.

[1-3-1-2] Case in which the logical sum of the memory bit map and the memory device bit map of area A or area B is all "1"

When a data block to be written is stored in one of area A 52b-1 and area B 52b-2, the write area determination unit 11a determines whether the data storing state of the entire memory device bit map 22a regarding the one data area 52b is all "1". When it is determined that the data storing state is all "1", the write area determination unit 11a determines another data area 52b, which is different from the data area 52b of all "1", as one data area 52b in which the data block is to be written.

In other words, the write area determination unit 11a determines whether the entire bit locations, which are "1", in the memory device bit map 22a of the data area 52b are included in the entire bit locations, which are "1", in the memory bit map 22b of the data block to be written. That is, the write area determination unit 11a determines whether the area of the entire data blocks, the data storing state of which is valid, in the data area 52b allocated with respect to the data block to be written is included in the entire area, in which the data block to be written is stored, in the data area 52b. When a determination of inclusion is made, the write area determination unit 11a determines the corresponding data area 52b as one data area 52b in which the data block is to be written.

An example will be described with reference to FIG. 4. It will be assumed that the memory area 52 of the HDD 5 has undergone random-write, and data is scattered and written in a plurality of data areas 52b. As illustrated in (1) of FIG. 4, the memory device bit map 22a has "1" scattered in area A 52b-1 by the bit map update unit 13a.

Figure 4:
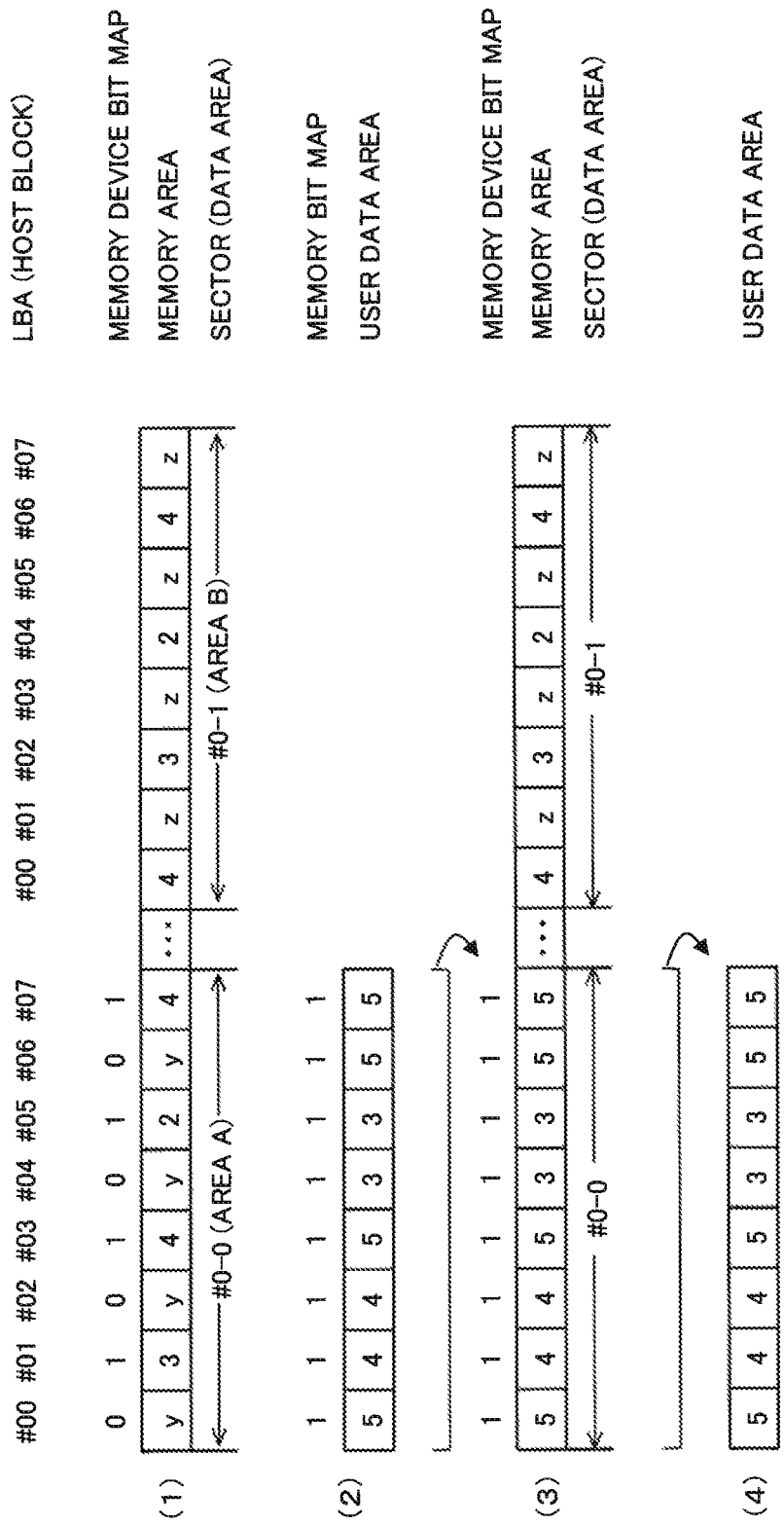
FIG. 4 is a diagram illustrating an operation example by the processor illustrated in FIG. 1.

Referring to (2) of FIG. 4, when the host device 3 issues a command to write data blocks of LBAs #00 to #07, the memory bit map management unit 15 generates a memory bit map 22b having "1" for the first eight bits.

The write area determination unit 11a, in response to the write command, refers to the memory device bit map 22a of sector #0-0 (area A 52b-1) corresponding to the LBAs to be written and determines, when the logical sum with the memory bit map 22b is taken, whether the entire bits are "1". In the case illustrated in (2) of FIG. 4, only the memory bit map 22b has "1" for the entire eight host blocks, meaning that they constitute user data of 4096 bytes conforming to the boundary, so that the write area determination unit 11a does not even have to select from area A 52b-1 and area B 52b-2. For example, when the write area determination unit 11a has selected area A 52b-1, the write processing unit 11b writes the data block to be written, of 4096 bytes, in area A 52b-1 (refer to (3) of FIG. 4).

Another example will be described with reference to FIG. 5. It will be assumed that the memory area 52 of the HDD 5 has undergone random writing, and data is written in a plurality of data areas 52b to be scattered by 1024 bytes. As illustrated in (1) of FIG. 5, the memory device bit map 22a has "1" set in area A 52b-1 by the bit map update unit 13a so that every two blocks are scattered.

Figure 5:
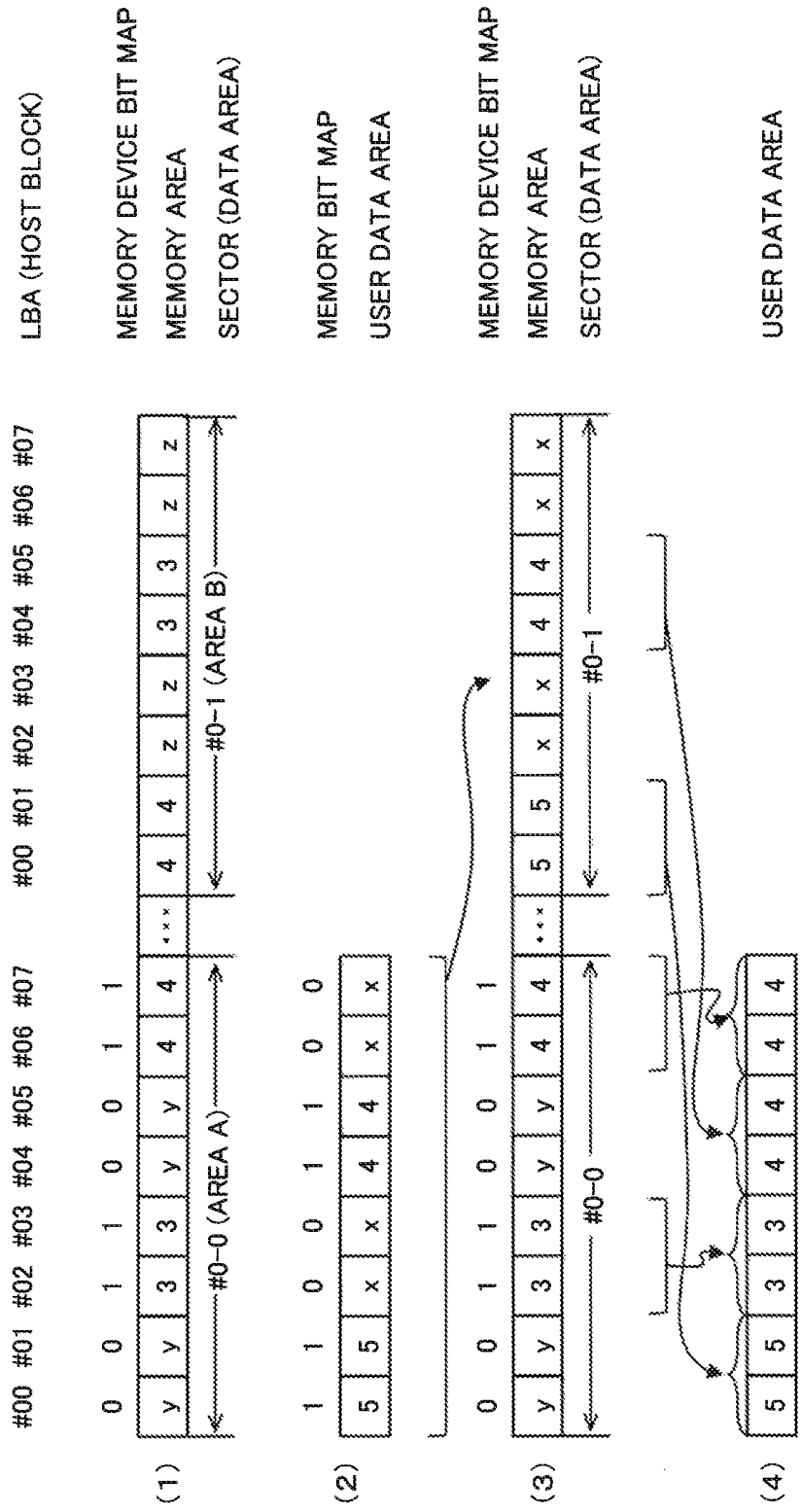
FIG. 5 is a diagram illustrating an operation example by the processor illustrated in FIG. 1.

Referring to (2) of FIG. 5, when the host device 3 issues a command to write data blocks of LBAs #00, #01, #04, and #05, the memory bit map management unit 15 generates a memory bit map 22b having "1" scattered for every two bits.

The write area determination unit 11a, in response to the write command, refers to the memory device bit map 22a of sector #0-0 (area A 52b-1) corresponding to the LBAs to be written and determines, when the logical sum with the memory bit map 22b is taken, whether the entire bits are "1". In the case illustrated in (2) of FIG. 5, the logical sum of the memory device bit map 22a of area A 52b-1 and the memory bit map 22b becomes all "1", so that the write area determination unit 11a determines area B 52b-2, which is different from area A 52b-1, as one data area 52b in which the data block is to be written.

In addition, the write processing unit 11b generates (acquires), based on the memory bit map 22b, data blocks of LBAs #00, #01, #04, and #05 to be written and data blocks of LBAs #02, #03, #06, and #07, which are dummy data. The write processing unit 11b then writes the generated write data block of 4096 bytes in the data area 52b determined by the write area determination unit 11a (refer to (3) of FIG. 5).

Another example will be described with reference to FIG. 6. It will be assumed that the host device 3 is a main frame, and the address to be written, which is designated by the host device 3, is not an LBA, but Count Key Data (CKD). In the case of CKD, the size of a data block to be written is a fixed size, which is referred to as a record (refer to "R1" to "R4" in (1) of FIG. 6), and one record is larger than 512 bytes but is not an integer multiple of 512 bytes. Furthermore, the controller module 4 converts CKD, which is designated by the host device 3, to a LBA and sets a correspondence between the record to be written (data block to be written) and the LBA. In addition, the controller module 4 adds dummy data to a part, which falls short of 512 bytes when the record is divided in a 512 byte unit, so that the boundary of the corresponding part conforms to 512 bytes. In the example illustrated in FIG. 6, the size of the record is adjusted to five data blocks (2560 bytes) by adding dummy data.

It will be also assumed that the memory area 52 of the HDD 5 has just been formatted, and the entire data areas 52b have data of all "0" memorized therein. As illustrated in (2) of FIG. 6, in the memory device bit map 22a right after formatting, all "1" is set in areas A 52b-1 (first group 52a-1) by the bit map update unit 13a.

Figure 6:
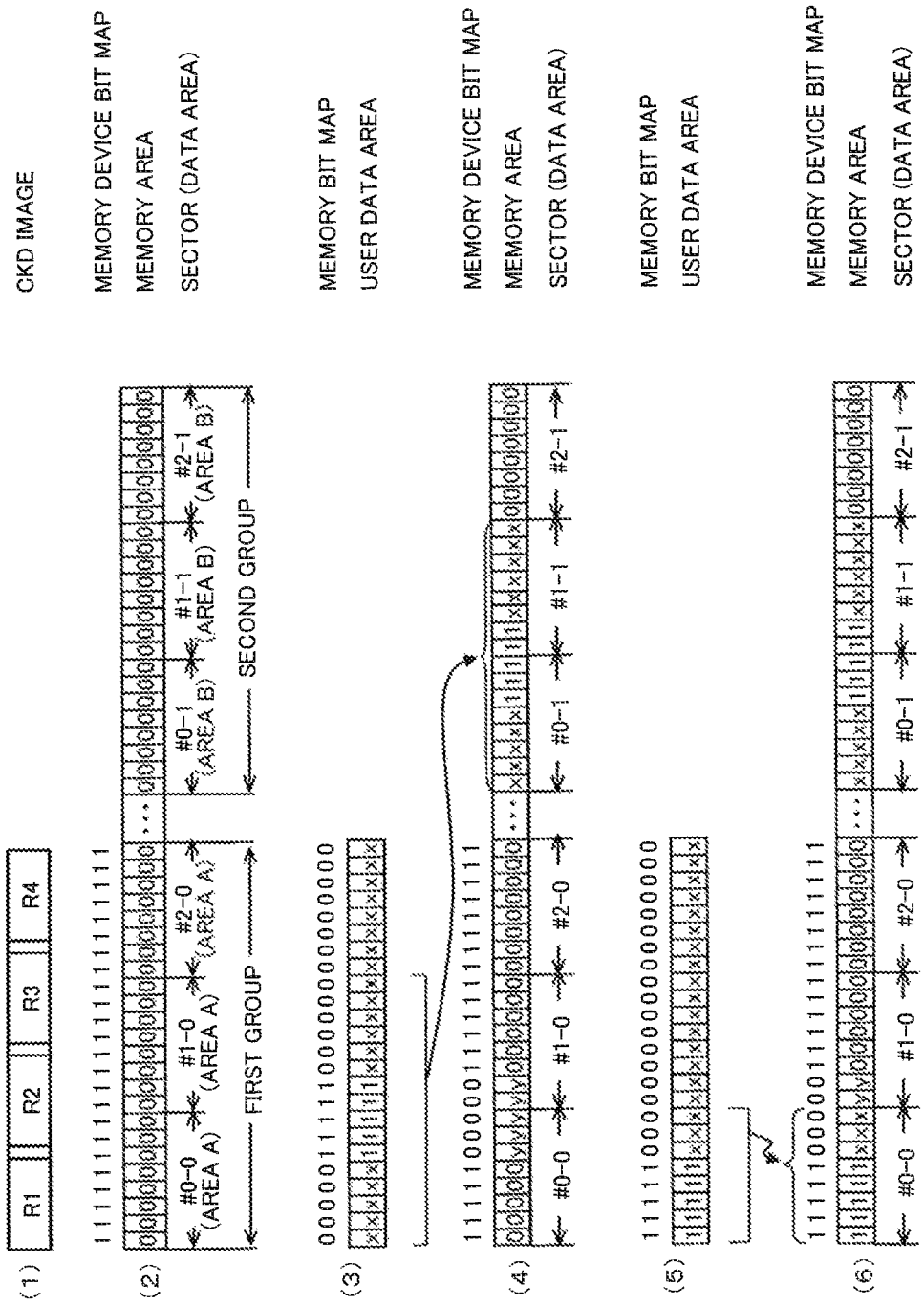
FIG. 6 is a diagram illustrating an operation example by the processor illustrated in FIG. 1.

When the host device 3 issues a command to write a record of generation "1" in R2 based on the above-mentioned assumptions, data of R2 of generation "1" is stored in the user data area 21 of the memory 20 (refer to (3) of FIG. 6). Furthermore, the memory bit map management unit 15 generates a memory bit map 22b having "1" for bits corresponding to R2 (bits from $6^{th}$ bit to $10^{th}$ bit).

The write area determination unit 11a, in response to the write command, refers to the memory device bit map 22a of sectors #0-0 and #1-0 (areas A 52b-1), which correspond to the record to be written, and determines whether the entire bits in respective sectors are "1". In the example illustrated in (4) of FIG. 6, the memory device bit map 22a of either of sectors #0-0 and #1-0 is all "1". Therefore, the write area determination unit 11a determines sectors #0-1 and #1-1, which are areas B 52b-2 different from areas A 52b-1, as one data area 52b in which the record is to be written, respectively.

In addition, the write processing unit 11b writes the record of R2, which is to be written, in sectors #0-1 and #1-1, which are areas B 52b-2 determined by the write area determination unit 11a. At this time, the write processing unit 11b generates (acquires), based on the memory bit map 22b, the record of R2 to be written, from the user data area 21, and data blocks that are dummy data (refer to data "x" corresponding to sectors #0-0 to #1-0 in (3) of FIG. 6). The write processing unit 11b then writes the generated write data block of 4096 bytes×2 in the data area 52b determined by the write area determination unit 11a (refer to (4) of FIG. 6).

Next, when the host device 3 issues a command to write a record of generation "1" in R1, data of R1 of generation "1" is stored in the user data area 21 of the memory 20 (refer to (5) of FIG. 6). Furthermore, the memory bit map management unit 15 generates a memory bit map 22b having "1" for bits corresponding to R1 (bits from $1^{st}$ bit to $5^{th}$ bit).

The write area determination unit 11a, in response to the write command, refers to the memory device bit map 22a of sector #0-0 (area A 52b-1), which corresponds to the record to be written, and determines whether the entire bits are "1" in respective sectors. In the example illustrated in (4) of FIG. 6, the memory device bit map 22a of sector #0-0 is not all "1".

The write area determination unit 11a then refers to the memory device bit map 22a of sectors #0-0 and #0-1 (areas A 52b-1), which correspond to the record to be written, and determines, when the logical sum with the memory bit map 22b is taken, whether the entire bits become "1". In the example illustrated in (5) of FIG. 6, the logical sum of the memory device bit map 22a of area B 52b-2 and the memory bit map 22b becomes all "1", so that the write area determination unit 11a determines area A 52b-2, which is different from area B 52b-1, as one data area 52b in which the data block is to be written.

In addition, the write processing unit 11b writes the record of R1, which is to be written, in sector #0-0, which is area A 52b-1 determined by the write area determination unit 11a. At this time, the write processing unit 11b generates (acquires), based on the memory bit map 22b, the record of R1 to be written, from the user data area 21, and data blocks that are dummy data (refer to data "x" corresponding to sector #0-0 in (5) of FIG. 6). The write processing unit 11b then writes the generated write data block of 4096 bytes in the data area 52b determined by the write area determination unit 11a (refer to (6) of FIG. 6).

As described with reference to FIG. 6, the storage device 2 according to the present embodiment can suppress occurrence of RMW, even when the host device 3 is a main frame, and lessen degradation of performance of the HDD 5. Particularly, when the record size is larger than 4096 bytes (one sector), which correspond to the second size, at most two records belong to one sector. This means that the write area determination unit 11a can determine one data area 52b, in which data blocks are to be written, from areas A 52b-1 or areas B 52b-2. In other words, when the record size is larger than the second size, no RMW comes to occur, thereby removing degradation of performance of the HDD 5 resulting from RMW.

Also in the examples of FIG. 4 to FIG. 6, when the write processing unit 11b performs writing of a write data block, the bit map update unit 13a updates the memory device bit map 22a based on the memory bit map 22b.

Furthermore, although it has been assumed that the write area determination unit 11a determines whether the logical sum of the memory device bit map 22a of area A 52b-1 or area B 52b-2 and the memory bit map 22b becomes all "1", the present embodiment is not limited to this.

For example, the write area determination unit 11a can determine, as described above, whether the entire bit locations, which are "1", in the memory device bit map 22a of a data area 52b are included in the entire bit locations, which are "1", in the memory bit map 22b. In this case, the write area determination unit 11a determines a data area 52b, for which determination of inclusion has been made, as one data area 52b in which data blocks are to be written.

[1-3-1-3] Other Cases

In the above-described cases, the write area determination unit 11a can determine a data area 52b, in which RMW does not occur, but cases will now be described in which it is impossible to determine a data area 52b in which RMW does not occur.

An example will be described with reference to FIG. 7 and FIG. 8. It will be assumed that the memory area 52 of the HDD 5 has undergone write processing, and data is written in a plurality of data areas 52b as illustrated in (1) of FIG. 7 and (1) of FIG. 8. In the memory device bit map 22a, as illustrated in (1) of FIG. 7 and (1) of FIG. 8, "1" is set to be scattered in area A 52b-1 by the bit map update unit 13a.

Figure 7:
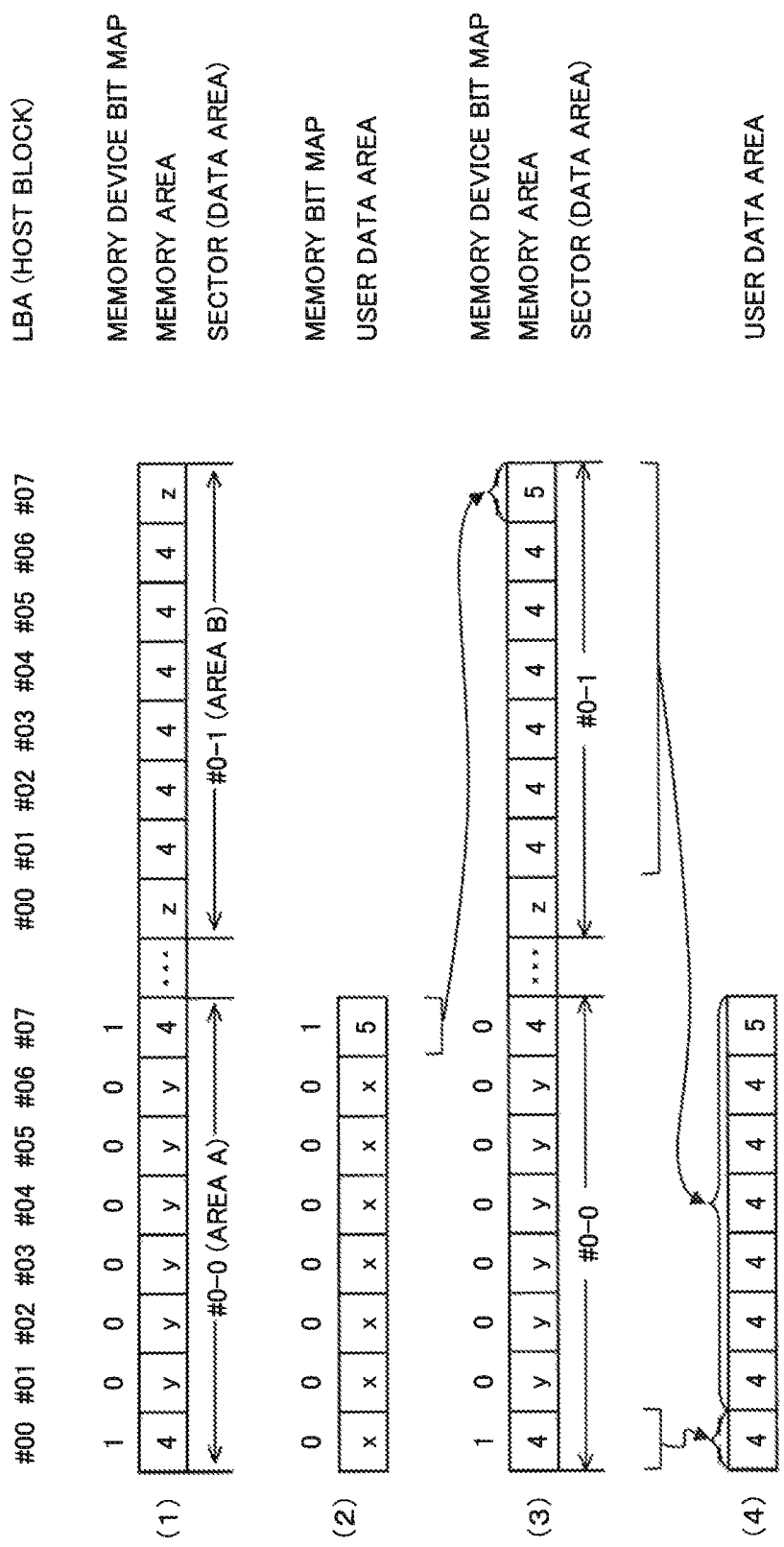
FIG. 7 is a diagram illustrating an operation example by the processor illustrated in FIG. 1.
Figure 8:
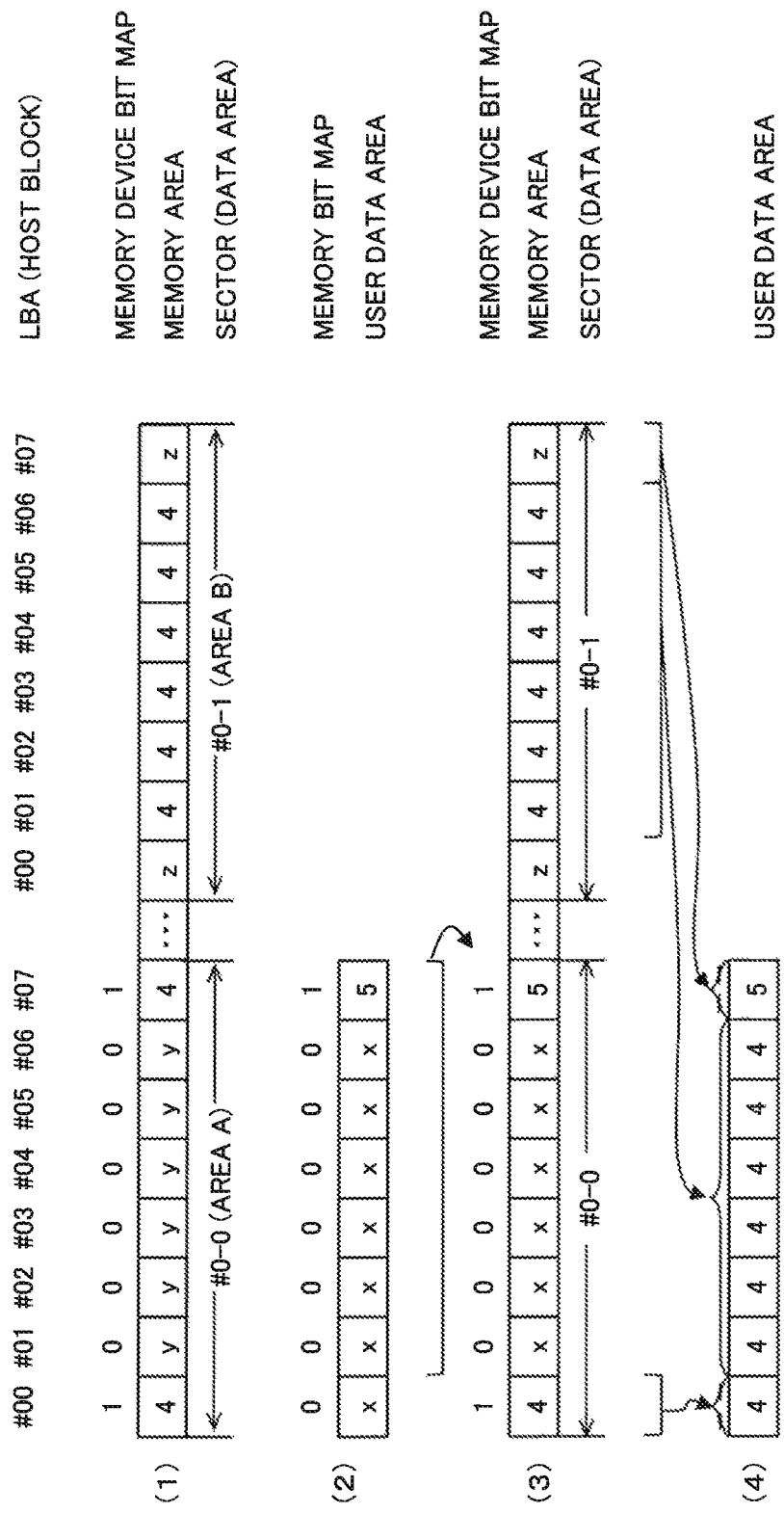
FIG. 8 is a diagram illustrating an operation example by the processor illustrated in FIG. 1.
Figure 9:
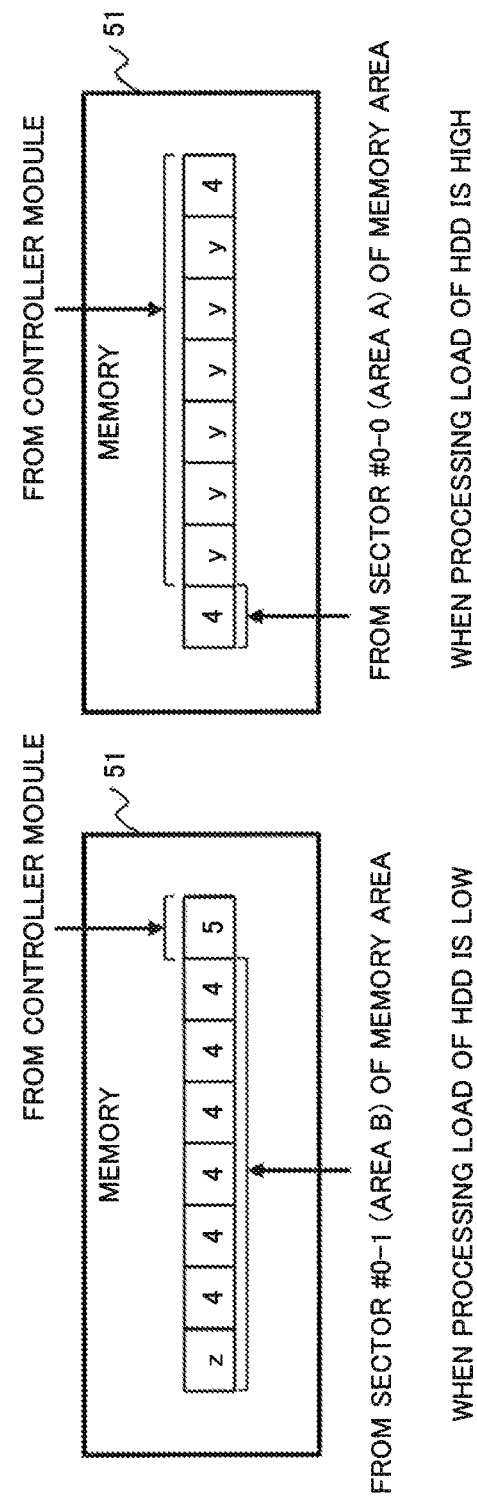
FIG. 9A is a diagram illustrating the amount of merge by the HDD in connection with the operation example illustrated in FIG. 7.
FIG. 9B is a diagram illustrating the amount of merge by the HDD in connection with the operation example illustrated in FIG. 8.

Referring to (2) of FIG. 7 and (2) of FIG. 8, when the host device 3 issues a command to write a data block of LBA #07, the memory bit map management unit 15 generates a memory bit map 22b having "1" for the last one bit.

The write area determination unit 11a, in response to the write command, tries to determine a data area 52b in which RMW does not occur. However, not the entire bits are "1" in sector #0-0 (area A 52b-1), which corresponds to the LBA to be written, and not the entire bits are "1" in the logical sum of the memory device bit map 22a of sector #0-0 and the memory bit map 22b.

RMW occurs in such a case, but the write area determination unit 11a selects, according to the above-mentioned condition, one data area 52b from area A 52b-1 and area B 52b-2.

The example illustrated in FIG. 7 will be used to describe a case in which the backend load is low, and the possibility that degradation of performance of the HDD 5 will occur is low.

In this case, the write area determination unit 11a selects a data area 52b in the HDD 5, in which there is a large amount of merge by RMW. A large amount of merge means that there is much valid data in the data area 52b. That is, the write area determination unit 11a has a data area 52b, which has much valid data, prepared in one of area A 52b-1 or area B 52b-2. This increases the possibility that the logical sum of the memory device bit map 22a of area A 52b-1 and the memory bit map 22b will have "1" for all bits at the time of write-back, even when the number of host blocks written from the host device 3 decreases in the case of writing at the next time or later.

For example, as illustrated in (3) of FIG. 7, the write area determination unit 11a selects area B 52b-2 as one data area 52b, in which data blocks are to be written, so that there is more valid data within one sector although there is a large amount of reading by RMW in the HDD 5.

Furthermore, the write processing unit 11b writes the data block of LBA #07, which is to be written, in area B 52b-2 determined by the write area determination unit 11a (refer to (4) of FIG. 7).

In addition, as illustrated in FIG. 9A, the HDD 5 reads data as large as seven data blocks from sector #0-1 (area B 52b-2) of the memory area 52 by RMW and merges the data with one data block from the write processing unit 11b at the memory 51. The HDD 5 then writes the result of merge to sector #0-1 and finishes processing.

When the write processing unit 11b writes the write data block, the bit map update unit 13a also updates the memory device bit map 22a.

As a result of the above-mentioned processing, seven data blocks in sector #0-1, which correspond to LBAs #01 to #07, become valid data.

On the other hand, the example of FIG. 8 will be used to describe a case in which the backend load is high, and the possibility that degradation of performance of the HDD 5 will occur is high.

In this case, the write area determination unit 11a selects a data area of a small amount of merge, in order to prevent the backend load from rising any further.

For example, as illustrated in (3) of FIG. 8, the write area determination unit 11a selects area A 52b-1, which has a small amount of reading by RMW in the HDD 5, as one data area 52b in which data blocks are to be written.

Furthermore, the write processing unit 11b writes the data block of LBA #07, which is to be written, in area B 52b-2 determined by the write area determination unit 11a. At this time, the write processing unit 11b generates (acquires), based on the memory bit map 22b, the data block of LBA #07 to be written, from the user data area 21, and data blocks of LBAs #01 to #06, which are dummy data. The write processing unit 11b then writes the generated write data block, which is as large as seven data blocks, in the data area 52b determined by the write area determination unit 11a (refer to (4) of FIG. 8).

In addition, as illustrated in FIG. 9B, the HDD 5 reads data as large as one data block from sector #0-0 (area A 52b-1) of the memory area 52 by RMW and merges the data with seven data blocks from the write processing unit 11b at the memory 51. The HDD 5 then writes the result of merge to sector #0-0 and finishes processing.

When the write processing unit 11b writes the write data block, the bit map update unit 13a also updates the memory device bit map 22a.

As a result of the above-mentioned processing, as illustrated in FIG. 9B, data read from sector #0-0 of the memory area 52 by RMW in the HDD 5 is only one data block. Therefore, compared with the case of FIG. 9A, degradation of performance of the HDD 5 can be decreased.

As described above, the controller module 4 according to the present embodiment performs control so that, with respect to a data block seen from the host device 3, data blocks of an integer multiple (for example, two times) are held in the HDD 5. And the write controller 11, when writing data blocks to be written to the HDD 5, selects a data area 52b, in which RMW occurs as little as possible, and performs writing, thereby performing control for suppressing performance degradation.

[1-3-2] Description of the Read Controller

Referring back to FIG. 1, the read controller 12 is configured to perform control of reading read data from the HDD 5 in response to a read request from the host device 3 and delivering the data to the host device 3. For example, the read controller 12 includes a read area determination unit 12a, a read processing unit 12b, and a data merge processing unit 12c.

The read area determination unit 12a is configured to determine at least one data area 52b from a plurality of data areas 52b in response to a request to read at least one data block of a first size, which forms data to be read.

Specifically, the read area determination unit 12a determines, when a read request is received from the host device 3, which data area 52b of area A 52b-1 and area B 52b-2 includes the designated data, with reference to a memory device bit map 22a of a plurality of data areas allocated with respect to at least one data block to be read.

The read processing unit 12b is configured to read, based on the memory device bit map 22a, a data block related to the read request, which has a valid data storing state, from at least one data area 52b determined by the read area determination unit 12a.

When data related to the read request is included in only one data area 52b of area A 52b-1 and area B 52b-2, for example, the read processing unit 12b reads a data block related to the read request from the corresponding data area 52b and outputs the data block to the host device 3. Specifically, the read processing unit 12b performs, based on the management information regarding a plurality of data areas allocated with respect to at least one data block to be read, processing of reading at least one data block to be read, which has a valid data storing state, from at least one data area determined by the read area determination unit 12a.

An example will be described with reference to FIG. 4. It will be assumed that data is stored in the memory device bit map 22a and the memory area 52 as illustrated in (3) of FIG. 4. In addition, referring to (2) of FIG. 4, data of LBAs #00 to #07 stored in the user data area 21 is entirely deleted from the memory 20, resulting in a cache miss state.

Referring to (3) of FIG. 4, when the host device 3 issues a request to read data of LBAs #00 to #07, the read area determination unit 12a refers to the memory device bit map 22a and determines in which data area 52b the data related to the read request is stored. In the example of (3) of FIG. 4, the data storing state of area A 52b-1 is all "1", so that respective data blocks of LBAs #00 to #07 are entirely stored in area A 52b-1. Therefore, the read area determination unit 12a determines that the data area 52b, from which data blocks related to the read request are to be read, is area A 52b-1.

In addition, the read processing unit 12b reads data blocks of LBAs #00 to #07, which are related to the read request, from area A 52b-1, which has been determined by the read area determination unit 12a, and outputs them to the host device 3.

On the other hand, it is also possible to consider a case in which data related to the read request is stored and distributed in both area A 52b-1 and area B 52b-2. In this case, the read processing unit 12b instructs the data merge processing unit 12c to generate data related to the read request, in connection with data blocks read from respective data areas 52b.

The data merge processing unit 12c is configured to perform, when data blocks related to the read request are respectively read from at least two data areas 52b by the read processing unit 12b, processing of merging respective data blocks that have been read and generating data to be read. Merge processing by the data merge processing unit 12c is performed on the user data area 21 of the memory 20, for example. The data merge processing unit 12c, when data related to the read request is generated by performing merge processing, outputs the data to the host device 3 via the read processing unit 12b or directly.

An example will be described with reference to FIG. 3, FIG. 5, FIG. 7, and FIG. 8. It will be assumed that data is stored in the memory device bit map 22a and the memory area 52 as illustrated in (4) of FIG. 3 and (3) of FIG. 5, FIG. 7 and FIG. 8. Furthermore, in connection with (3) of FIG. 3 and (2) of FIG. 5, FIG. 7 and FIG. 8, data of LBAs #00 to #07 stored in the user data area 21 is entirely deleted from the memory 20, resulting in a cache miss state.

When the host device 3 issues a request to read data of LBAs #00 to #07, the read area determination unit 12a refers to the memory device bit map 22a and determines in which data area 52b the data related to the read request is stored. In the example illustrated in (4) of FIG. 3, respective data blocks of LBAS #00 to #03 are stored in area B 52b-2, and respective data blocks of LBAs #04 to #07 are stored in area A 52b-1. In the example illustrated in (3) of FIG. 5, respective data blocks of LBAs #00, #01, #04, and #05 are stored in area B 52b-2, and respective data blocks of LBAs #02, #03, #06, and #07 are stored in area A 52b-1. In the example illustrated in (3) of FIG. 7, respective data blocks of LBAs #01 to #07 are stored in area B 52b-2, and the data block of LBA #00 is stored in area A 52b-1. In addition, in the example illustrated in (3) of FIG. 8, respective data blocks of LBAs #01 to #06 are stored in area B 52b-2, and respective data blocks of LBAs #00 and #07 are stored in area A 52b-1.

Therefore, since the data storing state of neither area A 52b-1 nor area B 52b-2 is all "1", the read area determination unit 12a determines that the data area 52b, from which data blocks related to the read request are to be read, is area A 52b-1 and area B 52b-2.

In addition, the read processing unit 12b reads data blocks of LBAs #00 to #07, which are related to the read request, from area A 52b-1 and area B 52b-2, which have been determined by the read area determination unit 12a, respectively, and stores them in the user data area 21. The read processing unit 12b then instructs the data merge processing unit 12c to compose data related to the read request.

The data merge processing unit 12c merges respective data blocks stored in the user data area 21. In the example illustrated in (5) of FIG. 3, the data merge processing unit 12c merges respective data blocks of LBAs #00 to #03 from area B 52b-2 and respective data blocks of LBAs #04 to #07 from area A 52b-1. In the example illustrated in (4) of FIG. 5, the data merge processing unit 12c merges respective data blocks of LBAs #00, #01, #04, and #05 from area B 52b-2 and respective data blocks of LBAs #02, #03, #06, and #07 from area A 52b-1. In the example illustrated in (4) of FIG. 7, the data merge processing unit 12c merges respective data blocks of LBAs #01 to #07 from area B 52b-2 and the data block of LBA #00 from area A 52b-1. In addition, in the example illustrated in (4) of FIG. 8, the data merge processing unit 12c merges respective data blocks of LBAs #01 to #06 from area B 52b-2 and respective data blocks of LBAs #00 and #07 from area A 52b-1.

The data merge processing unit 12c then outputs the data related to the read request, obtained by merge, to the host device 3.

Although it has been assumed in the above-described cases that the read request from the host device 3 has a second size, the read controller 12 can deal with cases, in which the read request is issued in a first size unit, through the same control as described above.

[1-4] Operation Example of the Information Processing System

Figure 10:
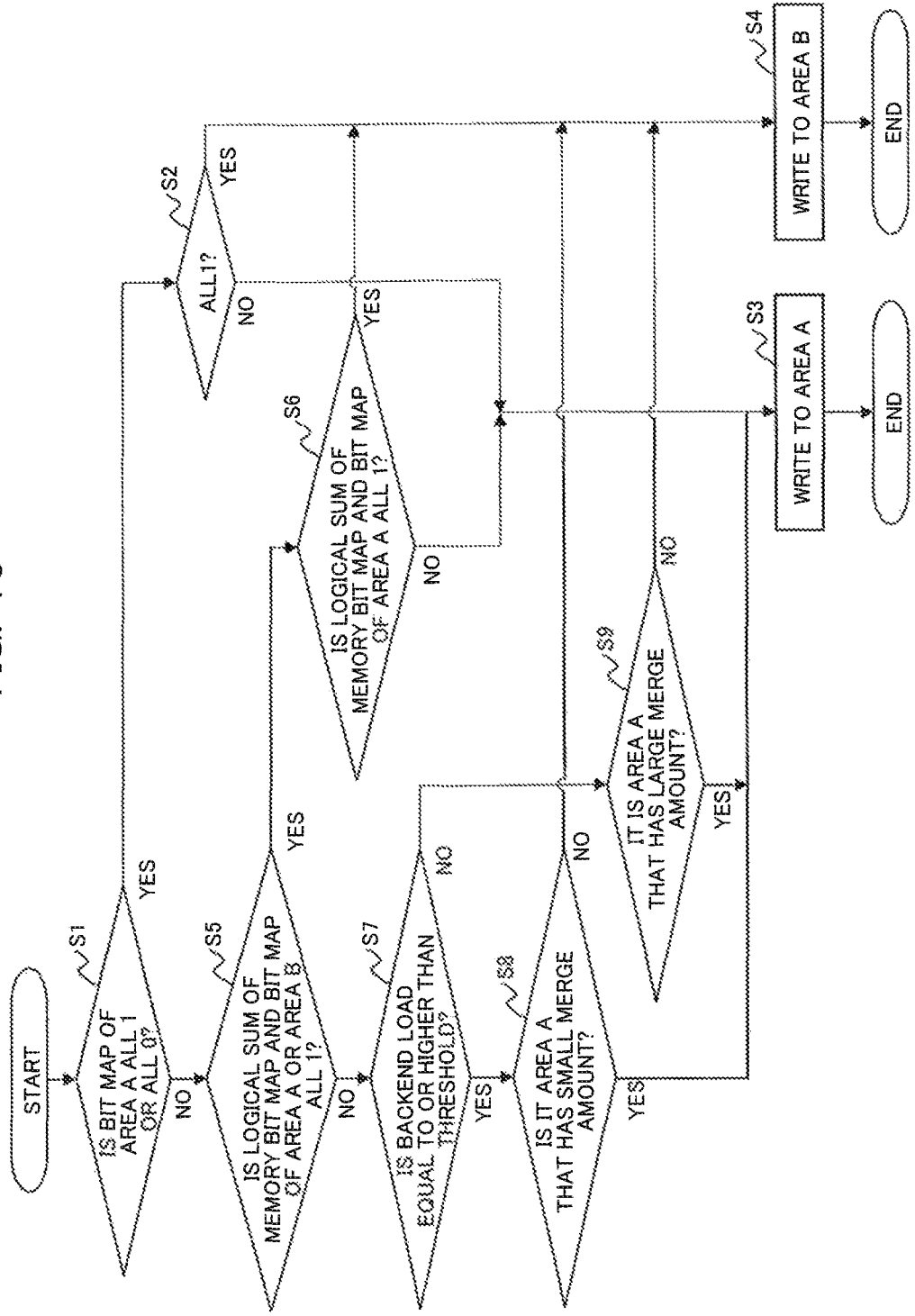
FIG. 10 is a flowchart illustrating an operation example by the write controller illustrated in FIG. 1.
Figure 11:
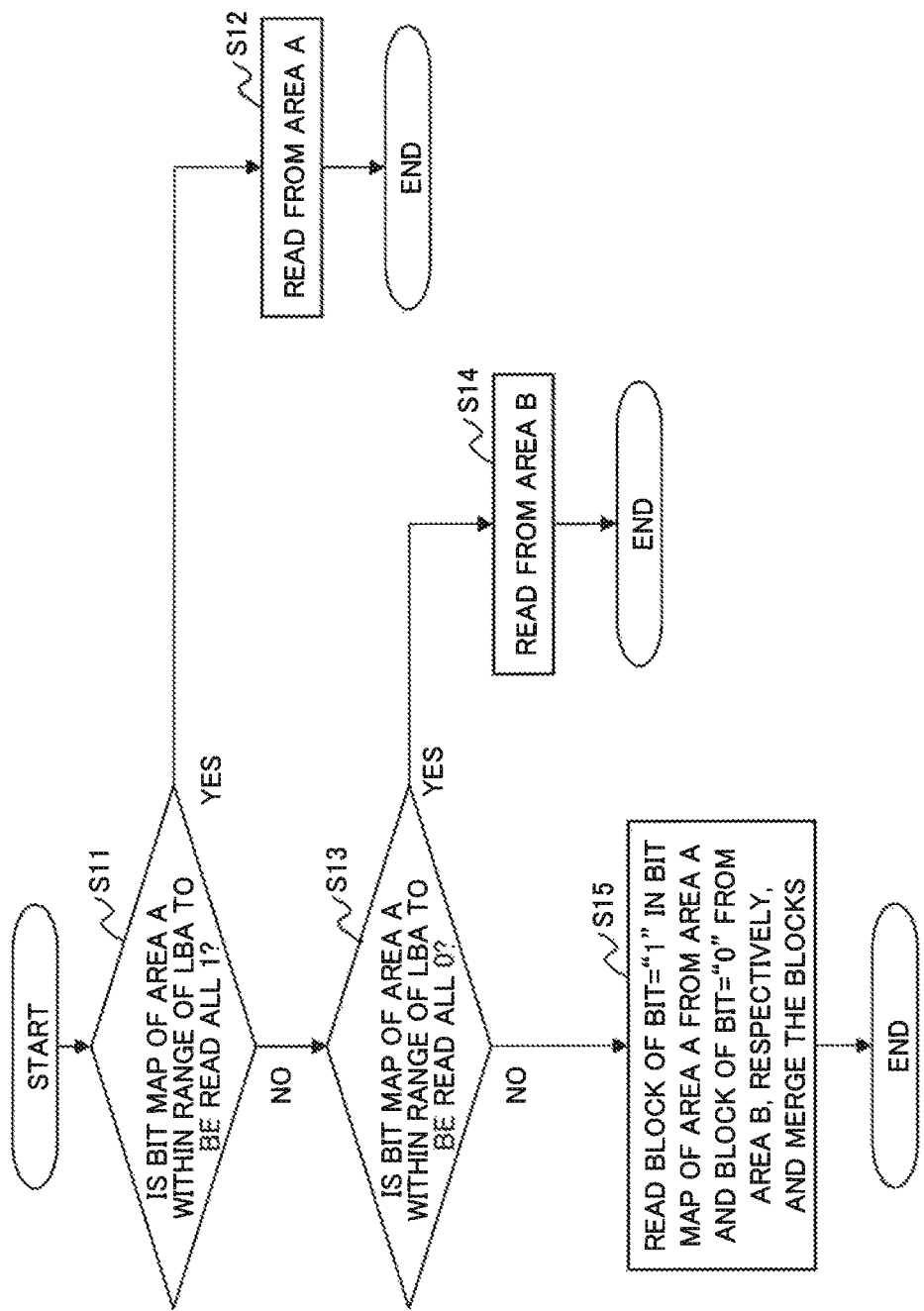
FIG. 11 is a flowchart illustrating an operation example by the read controller illustrated in FIG. 1.

Next, an operation example of the information processing system 1 (controller module 4), which is configured as described above, will be described with reference to FIG. 10 and FIG. 11. FIG. 10 is a flowchart illustrating an operation example by the write controller 11 illustrated in FIG. 1, and FIG. 11 is a flowchart illustrating an operation example by the read controller 12 illustrated in FIG. 1.

[1-4-1] Operation Example of the Write Controller

Firstly, the operation of the write controller 11 will be described with reference to FIG. 10.

It will be assumed that the write controller 11 has received a write command from the host device 3.

As illustrated in FIG. 10, it is determined by the write area determination unit 11a, in response to a write command from the host device 3, whether the memory device bit map 22a of area A 52b-1 is all "1" or all "0" (step S1). When a determination of all "1" or all "0" is made (route "Yes" of step S1), it is further determined by the write area determination unit 11a whether the memory device bit map 22a of area A 52b-1 is all "1" (step S2). When a determination of not all "1", i.e. determination of all "0" is made (route "No" of step S2), it is determined by the write area determination unit 11a that the data area 52b, which is the write target, is area A 52b-1. Then, user data related to the write request is written in area A 52b-1 by the write processing unit 11b (step S3), and the processing ends.

On the other hand, when it is determined at step S2 that the memory device bit map 22a of area A 52b-1 is all "1" (route "Yes" of step S2), it is determined by the write area determination unit 11a that the data area 52b, which is the write target, is area B 52b-2. Then, user data related to the write request is written in area B 52b-2 by the write processing unit 11b (step S4), and the processing ends.

In addition, when it is determined at step S1 that the memory device bit map 22a of area A 52b-1 is neither all "1" nor all "0" (route "No" of step S1), the following determination processing is performed by the write area determination unit 11a. That is, it is determined by the write area determination unit 11a whether the logical sum of the memory bit map 22b and the memory device bit map 22a of area A 52b-1 or area B 52b-2 is all "1" (step S5). When it is determined that the logical sum is all "1" (route "Yes" of step S5), it is determined by the write area determination unit 11a whether the logical sum of the memory bit map 22b and the memory device bit map 22a of area A 52b-1 is all "1" (step S6).

On the other hand, when it is determined that the logical sum of the memory bit map 22b and the memory device bit map 22a of area A 52b-1 is not all "1" (route "No" of step S6), the write area determination unit 11a proceeds to step S3. When it is determined that the logical sum of the memory bit map 22b and the memory device bit map 22a of area A 52b-1 is all "1" (route "Yes" of step S6), the write area determination unit 11a proceeds to step S4.

When it is determined at step S5 that the logical sum is not all "1" (route "No" of step S5), it is determined by the write area determination unit 11a whether the backend load is equal to or higher than a threshold (step S7). When it is determined that the backend load is equal to or higher than the threshold (route "Yes" of step S7), it is determined by the write area determination unit 11a whether it is area A 52b-1 that has a small amount of merge (step S8). When it is determined that it is area A 52b-1 that has a small amount of merge (route "Yes" of step S8), the write area determination unit 11a proceeds to step S3. On the other hand, when it is determined that it is not area A 52b-1 that has a small amount of merge (route "No" of step S8), the write area determination unit 11a proceeds to step S4.

In addition, when it is determined at step S7 that the backend load is below the threshold (route "No" of step S7), it is determined by the write area determination unit 11a whether it is area A 52b-1 that has a large amount of merge (step S9). When it is determined that it is area A 52b-1 that has a large amount of merge (route "Yes" of step S9), the write area determination unit 11a proceeds to step S3. On the other hand, when it is determined that it is not area A 52b-1 that has a large amount of merge (route "No" of step S9), the write area determination unit 11a proceeds to step S4.

[1-4-2] Operation Example of the Read Controller

Next, the operation of the read controller 12 will be described with reference to FIG. 11.

It will be assumed that the read controller 12 has received a read request from the host device 3.

As illustrated in FIG. 11, it is determined by the read area determination unit 12a whether the memory device bit map 22a of area A 52b-1 within the range of LBAs to be read, which are related to the read request, is all "1" (step S11). When a determination of all "1" is made (route "Yes" of step S11), reading of read data from area A 52b-1 is performed by the read processing unit 12b (step S12), and the processing ends.

On the other hand, when a determination of not all "1" is made at step S11 (route "No" of step S11), it is determined by the read area determination unit 12a whether the memory device bit map 22a of the corresponding area A 52b-1 is all "0" (step S13). When a determination of all "0" is made (route "Yes" of step S13), reading of read data from area B 52b-2 is performed by the read processing unit 12b (step S14), and the processing ends.

In addition, when a determination of not all "0" is made at step S13 (route "No" of step S13), processing by the data merge processing unit 12c is performed (step S15). That is, by the data merge processing unit 12c, data blocks having bit "1" and bit "0" in the memory device bit map 22a of area A 52b-1 are read from area A 52b-1 and area B 52b-2, respectively, and merged. The processing then ends.

[1-5] Summary

As described above, by means of the controller module 4 according to the present embodiment, a write data block of a second size (write data), which includes a data block of a first size to be written, is written to one data area 52b among a plurality of data areas 52b. Specifically, the controller module 4 writes data of a sector size, which includes target data designated by an LBA, in one sector, in which RMW does not occur, among a plurality of sectors larger than the block size of the LBA. Therefore, it is possible to suppress occurrence of reading (RMW) of data blocks of the second size, which follows writing of data blocks to be written, in the case of a memory device such as an HDD 5, thereby lessening degradation of performance of the HDD 5.

In the case of a 4K sector HDD (512E), there is also a possibility that RMW will occur frequently, and, compared with a conventional HDD of 512 bytes/sector, performance degradation becomes noticeable. Furthermore, in recent years, increase of HDD capacity is followed by increased frequency of access to HDDs. The number of disks does not change in spite of increase of HDD capacity, so that HDDs tend to be in a busy state, posing concerns of performance degradation.

In the case of the present embodiment, attention is directed to performance degradation following occurrence of RMW in a 4K sector HDD (512E), as well as performance degradation resulting from increased HDD capacity, and suppression of occurrence of RMW is realized by using a part of the memory capacity of the HDD, and the like. As a result of this, in connection with the present embodiment, it is possible to perform writing to the HDD 5 while suppressing occurrence of RMW as much as possible, so that, even when compared with conventional HDDs of 512 bytes/sector, comparable write performance can be obtained.

It is also conceivable to memorize data within the data area of the HDD on the cache memory, in order to suppress occurrence of RMW, but the cache memory is occupied in an HDD write size unit, worsening the cache memory utilization efficiency. In addition, there may be an effort to compensate for the worsening cache memory utilization efficiency by increasing the cache memory, but it is difficult to obtain a large capacity as in the case of an HDD.

According to the present embodiment, double the memory capacity of an HDD is used, but inexpensive HDDs of a large capacity have been widespread recently, making it possible to increase HDDs at a relatively low cost. Therefore, the controller module 4 according to the present embodiment is particularly suitable for a case in which it is expected to maintain write performance comparable to that of conventional HDDs of 512 bytes/sector at the sacrifice of the capacity of memory devices such as HDDs.

In addition, by means of the controller module 4 according to the present embodiment, the memory device bit map 22a is rewritten so that the data storing state of a plurality of memory areas, which are allocated with respect to a data block to be written, indicates a value conforming to a data area 52b, in which the corresponding data block is written. Therefore, it is possible to secure integrity of the data block to be written between a plurality of data areas 52b, so that the write area determination unit 11a can determine one data area 52b in which RMW does not occur.

In addition, by the write area determination unit 11a, in connection with steps S1, S2, S5, and S6 of FIG. 10, one data area 52b, in which a data block to be written is supposed to be written, is determined based on the memory device bit map 22a and the memory bit map 22b. Therefore, it is possible to secure integrity of the data block to be written between a plurality of data areas 52b, so that the write area determination unit 11a can determine one data area 52b in which RMW does not occur.

Furthermore, by the write area determination unit 11a, in connection with steps S7 to S9 of FIG. 10, a write data block of a predetermined size, which includes a data block to be written, is written to an optimal data area 52b conforming to a predetermined condition. Therefore, it is possible to lessen the influence of RMW in the case of writing at this time or the next.

In addition, the memory device bit map 22a is bit map information indicating, for each data block included in one data area 52b of area A 52b-1 and area B 52b-2, whether the data storing state of the corresponding data block is valid. Therefore, it is possible to manage the data storing state regarding two data areas 52b based on bit map information related to one data area 52b, thereby reducing resources for memorizing the memory device bit map 22a.

When a write data block is written to one data area 52b, furthermore, the memory device bit map management unit 13 updates, with respect to a data block of the first size included in the write data block, the data storing state of a plurality of memory areas allocated with respect to the corresponding data block. Therefore, the write area determination unit 11a can determine one data area 52b, in which RMW does not occur, based on the latest data storing state.

In addition, the read area determination unit 12a determines, in response to a data read request, at least one data area 52b, from which at least one data block forming data to be written is supposed to be read, among a plurality of data areas 52b. The read processing unit 12b then reads at least one data block to be read, which has a valid data storing state, from at least one data area determined by the read area determination unit 12a. Therefore, the read controller 12 can read at least one data block related to the read request from at least one data area 52b.

Furthermore, the data merge processing unit 12c merges respective data blocks, which have been read from at least two data areas among a plurality of data areas 52b, and generates data to be read. Therefore, even when data related to the read request is scattered in a plurality of data areas 52b, the data can be read through merge processing.

In addition, the write processing unit 11b generates a write data block using a data block to be written, which is held in the user data area 21, and an unnecessary data block held in the user data area 21. The write processing unit 11b then writes the generated write data block to one data area 52b. Therefore, the write processing unit 11b can easily generate a write data block without having to add dummy data and the like to the data block to be written.

[2] Variant

Figure 12:
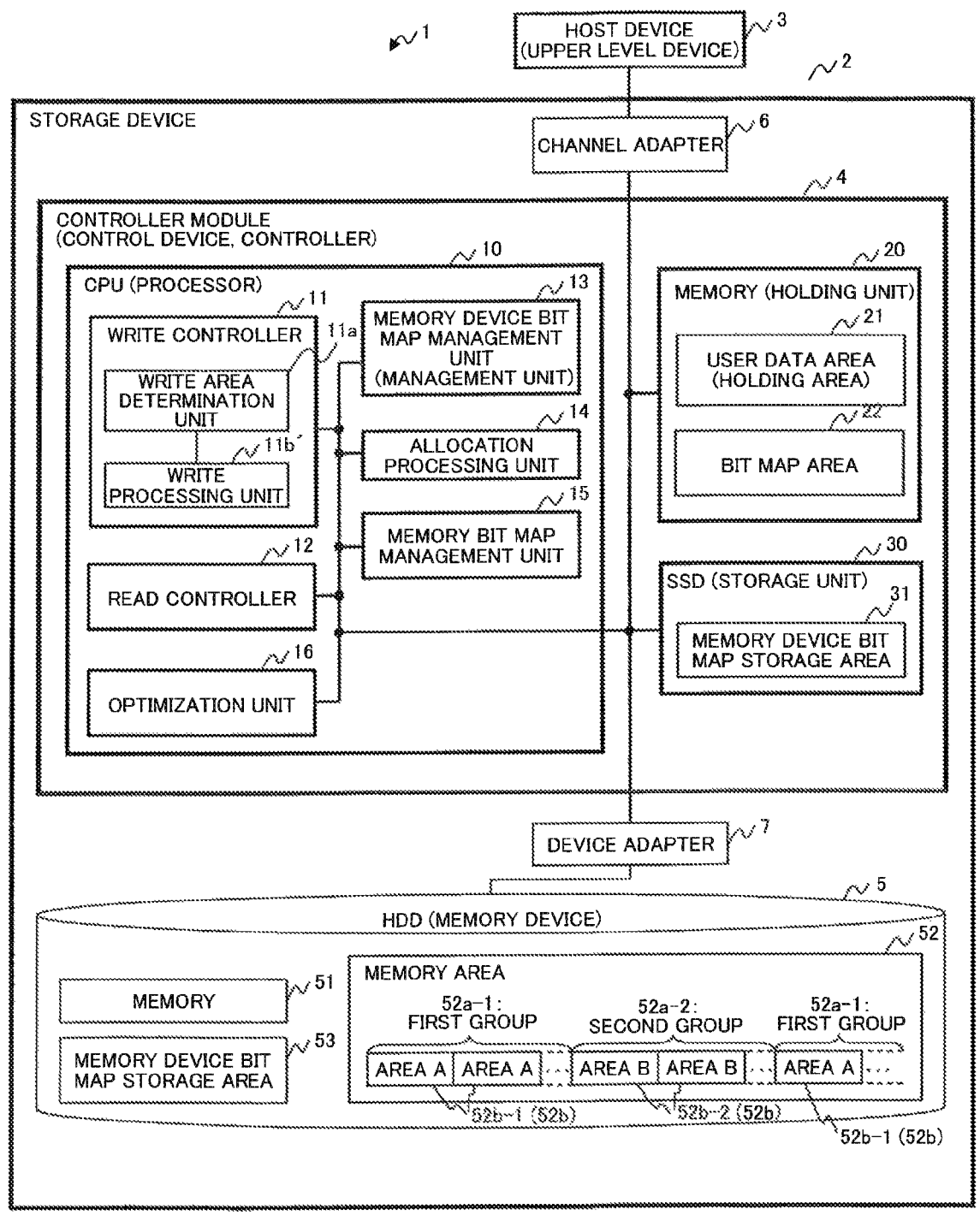
FIG. 12 is a diagram illustrating a variant of the configuration of an information processing system according to an embodiment.

In connection with the above-described embodiment, the CPU 10 of the controller module 4 can further include an optimization unit 16, as illustrated in FIG. 12, and the write controller 11 can include a write processing unit 11b' configured to perform additional processing with respect to the write processing unit 11b illustrated in FIG. 1.

FIG. 12 is a diagram illustrating a variant of the configuration of the information processing system 1 according to one embodiment. In FIG. 12, reference numerals identical to those in FIG. 1 correspond to components identical or similar to those in FIG. 1, so repeated descriptions will be omitted herein. In FIG. 12, furthermore, detailed illustration of the read controller 12, the memory device bit map management unit 13, and the bit map area 22 is omitted.

The CPU 10 illustrated in FIG. 12 is different from the CPU 10 illustrated in FIG. 1 in that the write controller 11 includes a write processing unit 11b', instead of the write processing unit 11b, and newly includes an optimization unit 16.

The optimization unit 16 is configured to move, between a plurality of data areas 52b, a plurality of data blocks stored in respective data areas 52b. Specifically, the optimization unit 16 reads all data blocks of the first size, which have a valid data storing state, from each of a plurality of data areas 52b at predetermined timing, based on the memory device bit map 22a managed by the memory device bit map management unit 13. The optimization unit 16 then generates a write data block of the second size (write data), which includes the data block that has been read, and writes the generated write data block in one data area 52b of a plurality of data areas 52b.

That is, when valid data blocks are scattered between a plurality of data areas 52b as in (1) of FIG. 4, for example, the optimization unit 16 reads the valid data blocks from respective data areas 52b to the user data area 21, for example. The optimization unit 16 then merges the plurality of data blocks, which have been read, into a write data block of 4096 bytes and writes it in one data area 52b of a plurality of data areas 52b (refer to sector #0-0 in (3) of FIG. 4, for example).

As an example of the predetermined timing, one of the following (i) and (ii) or a combination thereof can be given:
  (i) periodic timing
  (ii) timing at which the backend load, e.g. load of the HDD 5, has dropped below the threshold As such, by the optimization unit 16, data blocks, the data storing of which is valid, can be biased in one data area 52b, thereby increasing the probability of determining one data area 52b, in which RMW does not occur at the next time of writing. That is, at the next time of writing, the write controller 11 can, through the determinations of steps S1 and S2 of FIG. 10, write data blocks to be written, without causing RMW, in area A 52b-1 or area B 52b-2. Therefore, degradation of performance of the HDD 5 can be prevented.

The write processing unit 11b' has, in addition to the function of the write processing unit 11b illustrated in FIG.

1, a function of writing data, which has been generated by the data merge processing unit 12c, in one data area 52b of a plurality of data areas 52b allocated with respect to at least one data block forming the corresponding data. That is, the write processing unit 11b' writes data, which has been read from a plurality of data areas 52b by the read controller 12 and merged in the user data area 21, in one data area 52b.

As such, the same effect can be obtained by the write processing unit 11b' as by the optimization unit 16.

In addition, the CPU 10 can have at least one of the functions of the optimization unit 16 and the write processing unit 11b'. Furthermore, at least one of the write controller 11b' and the read controller 12, for example, can have the functions of the optimization unit 16 and the write processing unit 11b'.

As such, by the information processing system 1 according to a variant of one embodiment, not only the same effect as by the above-described information processing system 1 according to one embodiment, but also the same effect as by the above-mentioned optimization unit 16 and the write processing unit 11b', can be obtained.

[3] Hardware Configuration Example

Figure 13:
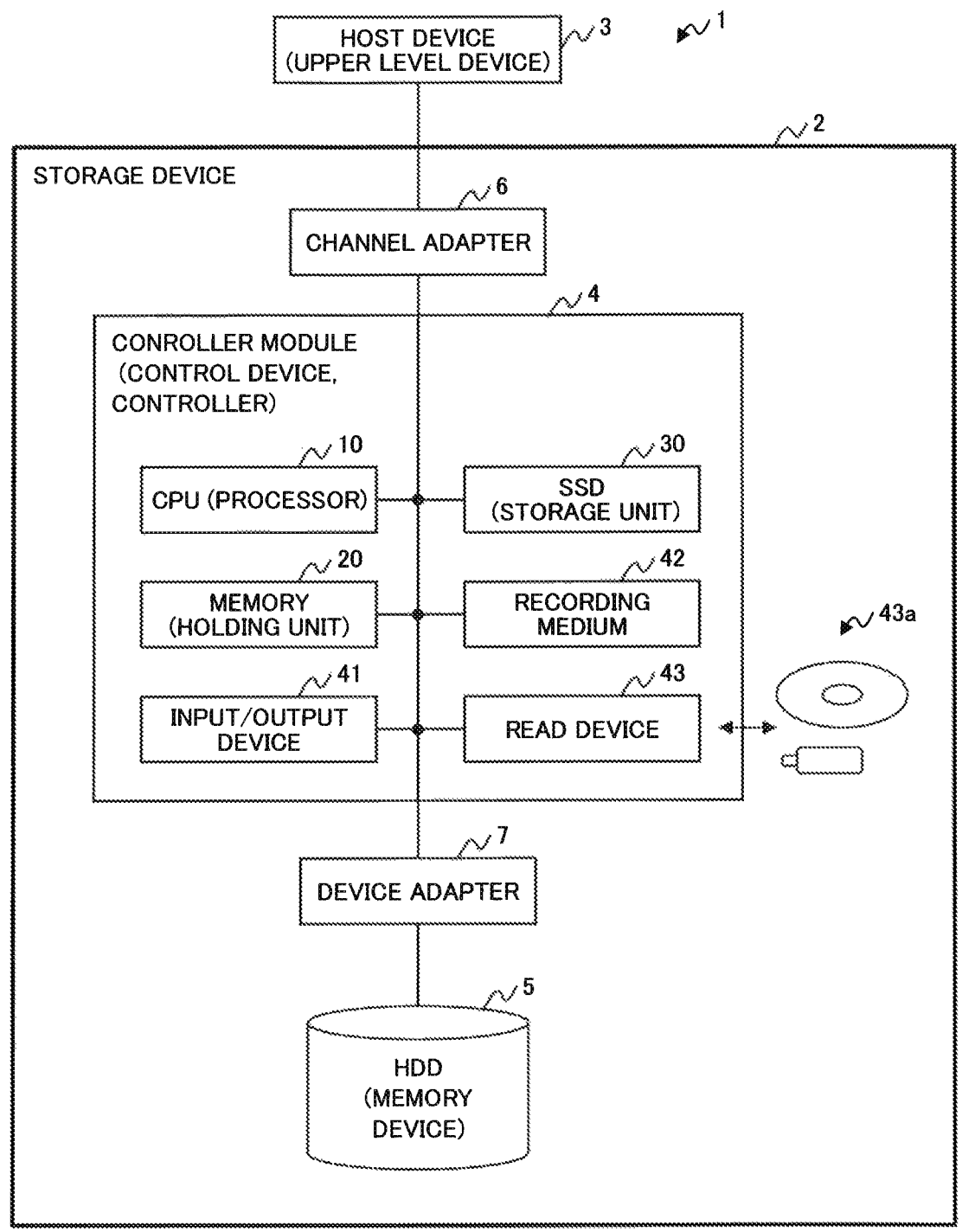
FIG. 13 is a diagram illustrating a hardware configuration example of the controller module illustrated in FIG. 1 or FIG. 12.

FIG. 13 is a diagram illustrating an example of hardware configuration of the controller module 4 illustrated in FIG. 1 or FIG. 12.

As illustrated in FIG. 13, the storage device 2 not only includes a CPU 10, a memory 20, and an SSD 30 described with reference to FIG. 1 or FIG. 12, but also includes an input/output device 41, a recording medium 42, and a read device 43.

The input/output device 41 includes at least one of an input device, such as a mouse or a keyboard, for example, and an output device such as a display or a printer, and is configured to receive an operation command by user manipulation, for example, and output a result of processing by the controller module 4.

The recording medium 42 is a memory device such as a flash memory or a ROM, and is configured to record various types of data or programs.

The read device 43 is a device configured to read data or a program, which is recorded on a computer-readable recording medium 43a such as an optical disk or a USB memory.

In the recording medium 42 and/or 43a, a control program that realizes the function of the processor according to one embodiment and its variant can be stored. That is, the CPU 10 expands a control program, which is input from the recording medium 42 or from the recording medium 43a via the read device 43, in a memory device such as a memory 20 and executes the program, thereby realizing the function of a processor.

In addition, each of the above-mentioned hardware is connected to be able to communicate with each other via buses.

[4] Others

A specific embodiment of the present invention has been described in detail, but the present invention is not limited to any specific relevant embodiment, but can be practiced through various changes and modifications without escaping from the idea of the present invention.

For example, it has been described in the above description of one embodiment and its variant that two data areas 52b constitute a set, but the embodiment is not limited to this. The controller module 4 can manage at least three data areas 52b in the memory area 52 of the HDD 5 and perform control so that data blocks are stored exclusively in at least three data areas 52b.

In addition, it has been assumed that the write processing unit 11b writes-back user data to the HDD 5, but the embodiment is not limited to this. For example, the above-mentioned configuration of the processor can be applied even when the write processing unit 11b performs write-through.

Furthermore, although it has been assumed that areas A 52b-1 and areas B 52b-2 are allocated to the memory area 52 of one HDD 5, the embodiment is not limited to this. Areas A 52b-1 and areas B 52b-2 can be allocated so that a plurality of sectors are grouped in predetermined units, respectively, and allocated to span a plurality of HDDs 5.

In addition, it has been assumed in the above description of one embodiment and its variant that the controller module 4 is included in the storage device 2, but the embodiment is not limited to this. For example, the controller module 4 can be included in each HDD 5 or in the host device 3.

Furthermore, although it has been assumed in the above description with reference to FIG. 13 that the controller module 4 according to one embodiment and its variant includes an input/output device 41, a recording medium 42, and a read device 43, the embodiment is not limited to this. For example, at least one of the input/output device 41, the recording medium 42, and the read device 43 can be included in the host device 3. The control program can be transmitted from the host device 3 to the controller module 4, and the CPU 10 of the controller module 4 can expand the control program, which has been transmitted from the host device 3, in the memory 20 and execute it. In addition, at least one of the host device 3 and the controller module 4 can be connected to a network, such as the Internet, in a wired or wireless manner. The CPU 10 can receive a control program from another device, which provides control programs, via the network, expand the received control program in the memory 20, and execute the program.

Furthermore, the controller module 4 according to one embodiment and its variant can perform the same control with respect to a plurality of 4K sector HDDs (512E) or storages of various Redundant Array of Inexpensive Disks (RAID) configurations using a plurality of 4K sector HDDs (512E).

In addition, in the case of the storage device 2 according to one embodiment and its variant, at least one of the channel adapter 6 and the device adapter 7 can be included in the controller module 4.

Furthermore, all or a part of various functions of the controller module 4 according to one embodiment can be realized through execution of a predetermined program by a computer (including a CPU, an information processing device, and various terminals).

Such a program is provided in front of being recorded on a computer-readable recording medium, such as a flexible disk, a CD (CD-ROM, CD-R, CD-RW, and the like), a DVD (DVD-ROM, DVD-RAM, DVD-R, DVD-RW, DVD+R, DVD+RW, and the like), a blue ray disk, and the like. In this case, the computer reads the program from the recording medium, transmits it to an internal memory device or an external memory device, stores it, and utilizes it.

In this connection, a computer is a concept including hardware and an OS (Operating System), and means hardware functioning under the control of the OS. In addition, when an application program is solely used to operate the hardware because the OS is unnecessary, the hardware itself corresponds to the computer. The hardware includes at least a microprocessor such as a CPU and a means for reading a computer program recorded on a recording medium. The above-mentioned program includes a program code that causes the above-mentioned computer to realize various functions of the controller module (control device, controller) 4 according to one embodiment. A part of the functions can also be realized by the OS, not the application program.

According to the disclosed technology, it is possible to lessen degradation of write processing performance in the case of a memory device configured to store unit data of a first size in a data area of a second size, which is different from the first size.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A control device comprising a processor configured to:
   control input/output with respect to an upper level device in a data block unit of a first size and control input/output of data with respect to each of data areas of a memory device in a unit of a second size different from the first size;
   allocate a set of consecutive data blocks to a plurality of the data areas;
   manage first management information indicating a data storing state of each of the data blocks;
   determine, based on the first management information regarding a plurality of data areas allocated with respect to a data block to be written, one data area from the plurality of data areas; and
   generate write data of the second size including data of the data block to be written, and write the generated write data in the determined data area.

2. The control device according to claim 1, wherein the processor is configured to rewrite the first management information so that a data storing state of the data block to be written in one data area indicates validity, and a data storing state of the data block to be written in all the other data areas indicates invalidity, when data of the data block is written in the one data area.

3. The control device according to claim 2, wherein the processor is configured to:
   manage the data storing state, regarding the consecutive data blocks allocated to the data areas, so that, for each data block, one data block in one data area among the plurality of data areas indicates validness exclusively in connection with the one data block in all the other data areas, and
   when a determination is made, based on the first management information regarding a plurality of data areas allocated with respect to the data block to be written, that a data storing state of all data blocks in a first data area, which is one of the plurality of data areas, is invalid, determine that the first data area is the one data area.

4. The control device according to claim 3, wherein the processor is configured to determine that the first data area is the one data area when a determination is made, based on the first management information regarding a plurality of data areas allocated with respect to the data block to be written and second management information indicating areas, in which the data block to be written is stored, in the plurality of data areas allocated with respect to the data block to be written, that all areas of data blocks, in which the data storing state is valid, in the first data area are included in all areas, in which the data block to be written is stored, in the first data area.

5. The control device according to claim 4, wherein the processor is configured to:
   select, when the one data area is not determined from the plurality of data areas despite determinations based on the first and second management information, one data area from the plurality of data areas according to a predetermined condition, and
   generate write data of a predetermined size, which includes the data block to be written, based on the first management information regarding a plurality of data areas allocated with respect to the data block to be written in the selected data area, and write the generated write data in the selected data area.

6. The control device according to claim 3, wherein the plurality of data areas are two data areas of a first data area and a second data area,
   the first management information is bit map information indicating, for each of the data blocks included in one data area of the first and second data areas, whether a data storing state of the corresponding data blocks is valid or not, and
   the processor is configured to manage a data storing state regarding the first and second data areas based on the bit map information.

7. The control device according to claim 2, wherein the processor is configured to read all data blocks of the first size, the data storing state of which is valid, from each of the plurality of data areas based on the data storing state at predetermined timing, generate write data of the second size, which includes the read data blocks, and write the generated write data in one data area of the plurality of data areas.

8. The control device according to claim 2, wherein the processor is configured to update, when the write data is written in the one data area, a data storing state, with respect to data blocks of the first size included in the write data, of a consecutive data blocks.

9. The control device according to claim 2, wherein the processor is configured to:
   determine at least one data area, based on the first management information regarding a plurality of data areas allocated with respect to at least one data block forming data to be read, from the plurality of data areas, and
   read the at least one data block to be read, the data storing state of which is valid, from the at least one determined data area, based on the first management information regarding a plurality of data areas allocated with respect to the at least one data block to be read.

10. The control device according to claim 9, wherein the processor is configured to merge, when data blocks are respectively read from at least two data areas of the plurality of data areas, respective read data blocks and generate the data to be read.

11. The control device according to claim 10, wherein the processor is configured to write the data, which has been generated by merge, in one data area of a plurality of data areas allocated with respect to the at least one data block forming the corresponding data.

12. The control device according to claim 1, wherein the processor is configured to generate the write data using the data block to be written, which is held in a holding area of a holding unit, and an unnecessary data block held in the holding area and write the generated write data in the determined data area, the holding unit having a holding area of at least the second size configured to hold the data block to be written, which is written in one of the plurality of data areas.

13. A storage device comprising:
a memory device configured to store data and
a control device configured to perform input/output with respect to an upper level device in a data block unit of a first size and perform input/output of data with respect to each of data areas of the memory device in a unit of a second size different from the first size, the control device comprises a processor configured to:
allocate a set of consecutive data blocks to a plurality of the data areas;
manage first management information indicating a data storing state of each of the data blocks;
determine, based on the first management information regarding a plurality of data areas allocated with respect to a data block to be written, one data area from the plurality of data areas; and
generate write data of the second size including data of the data block to be written, and write the generated write data in the determined data area.

14. The storage device according to claim 13, wherein the processor is configured to rewrite the first management information so that a data storing state of the data block to be written in one data area indicates validity, and a data storing state of the data block to be written in all other data areas indicates invalidity, when data of the data block is written in the one data area.

15. The storage device according to claim 14, wherein the processor is configured to:
manage the data storing state, regarding the consecutive data blocks allocated to the data areas, so that, for each data block, one data block in one data area among the plurality of data areas indicates validness exclusively in connection with in all the other data areas, and
when a determination is made, based on the first management information regarding a plurality of data areas allocated with respect to the data block to be written, that a data storing state of all data blocks in a first data area, which is one of the plurality of data areas, is invalid, determine that the first data area is the one data area.

16. The storage device according to claim 15, wherein the processor is configured to determine that the first data area is the one data area when a determination is made, based on the first management information regarding a plurality of data areas allocated with respect to the data block to be written and second management information indicating areas, in which the data block to be written is stored, in the plurality of data areas allocated with respect to the data block to be written, that all areas of data blocks, in which the data storing state is valid, in the first data area are included in all areas, in which the data block to be written is stored, in the first data area.

17. The storage device according to claim 13, wherein the processor is configured to read all data blocks of the first size, the data storing state of which is valid, from each of the plurality of data areas based on the data storing state at predetermined timing, generate write data of the second size, which includes the read data blocks, and write the generated write data in one data area of the plurality of data areas.

18. The storage device according to claim 13, wherein the processor is configured to:
determine at least one data area, based on the first management information regarding a plurality of data areas allocated with respect to at least one data block forming data to be read, from the plurality of data areas, and
read the at least one data block to be read, the data storing state of which is valid, from the at least one determined data area, based on the first management information regarding a plurality of data areas allocated with respect to the at least one data block to be read.

19. The storage device according to claim 18, wherein the processor is configured to merge, when data blocks are respectively read from at least two data areas of the plurality of data areas, respective read data blocks and generate the data to be read.

20. A computer-readable recording medium having stored therein a control program for causing a computer to execute a process, the process comprising:
controlling input/output with respect to an upper level device in a data block unit of a first size and controlling input/output of data with respect to each of data areas of a memory device in a unit of a second size different from the first size;
allocating a set of consecutive data blocks to a plurality of the data areas;
managing management information indicating a data storing state of each of the data blocks;
determining, based on the management information regarding a plurality of data areas allocated with respect to a data block to be written, one data area from the plurality of data areas; and
generating write data of the second size including data of the data block to be written, and writing the generated write data in the determined data area.

* * * * *